US010107617B2

(12) United States Patent
Cao et al.

(10) Patent No.: US 10,107,617 B2
(45) Date of Patent: Oct. 23, 2018

(54) FEATURE POINT MATCHING METHOD OF PLANAR ARRAY OF FOUR-CAMERA GROUP AND MEASURING METHOD BASED ON THE SAME

(71) Applicant: Beijing Qingying Machine Visual Technology Co., Ltd., Beijing (CN)

(72) Inventors: Liang Cao, Beijing (CN); Xing Yin, Jiangsu (CN)

(73) Assignee: Beijing Qingying Machine Visual Technology Co., Ltd., Changzhou, Jiangsu (CN)

( * ) Notice: Subject to any disclaimer, the term of this patent is extended or adjusted under 35 U.S.C. 154(b) by 136 days.

(21) Appl. No.: 15/310,066

(22) PCT Filed: Jul. 4, 2016

(86) PCT No.: PCT/CN2016/088420
§ 371 (c)(1),
(2) Date: Nov. 9, 2016

(87) PCT Pub. No.: WO2018/006246
PCT Pub. Date: Jan. 11, 2018

(65) Prior Publication Data
US 2018/0073857 A1 Mar. 15, 2018

(51) Int. Cl.
*G06K 9/00* (2006.01)
*G01B 11/00* (2006.01)
(Continued)

(52) U.S. Cl.
CPC ............ *G01B 11/002* (2013.01); *G01B 11/00* (2013.01); *G06K 9/6212* (2013.01); *G06T 7/73* (2017.01);
(Continued)

(58) Field of Classification Search
None
See application file for complete search history.

(56) References Cited

U.S. PATENT DOCUMENTS 8,069,190 B2 11/2011 McColl et al.
8,351,685 B2 1/2013 Ho et al.
(Continued)

FOREIGN PATENT DOCUMENTS

CN 102679961 1/1996
CN 101033966 9/2007
(Continued)

OTHER PUBLICATIONS

Wiburn, Bennett. High performance imaging using arrays of inexpensive cameras. Diss. Stanford University, 2004.*
(Continued)

*Primary Examiner* — Andrae S Allison
(74) *Attorney, Agent, or Firm* — Peter L. Brewer; Thrive IP

(57) ABSTRACT

A feature point matching method of a planar array of a four-camera group and a measuring method based on the feature point matching method of the planar array of the four-camera group relate to the field of optical electronic measurement. The matching method comprises determining unique matching point groups on four imaging planes corresponding to the same viewed point. For each unique matching point group, three-dimensional space coordinates of the viewed point can be calculated according to image coordinates of the matching point group and parameters of the camera system itself. Under any illumination conditions, as long as the acquired image is clear enough, for any viewed object imaged on an image of a planar array of a four-camera group and having certain image features, using completely identical matching method and measuring
(Continued)

method can realize three-dimensional measurement of the viewed object.

11 Claims, 8 Drawing Sheets

(51) Int. Cl.
    *G06T 7/73*     (2017.01)
    *H04N 13/106*     (2018.01)
    *H04N 13/189*     (2018.01)
    *H04N 13/243*     (2018.01)
    *G06K 9/62*     (2006.01)

(52) U.S. Cl.
    CPC ......... *H04N 13/106* (2018.05); *H04N 13/189* (2018.05); *H04N 13/243* (2018.05)

(56) References Cited

U.S. PATENT DOCUMENTS

| | | | |
|---|---|---|---|
| 8,395,642 B2 | 3/2013 | Yea et al. | |
| 8,447,093 B2 | 5/2013 | Nireki | |
| 8,643,701 B2 | 2/2014 | Nguyen et al. | |
| 9,300,946 B2 | 3/2016 | Do et al. | |
| 2005/0075585 A1 | 4/2005 | Kim et al. | |
| 2009/0115780 A1 | 5/2009 | Varekamp et al. | |
| 2010/0309292 A1 | 12/2010 | Ho et al. | |
| 2011/0025905 A1 | 2/2011 | Tanaka | |
| 2011/0074925 A1* | 3/2011 | Turner | H04N 13/261 348/46 |
| 2011/0249889 A1 | 10/2011 | Kothandaraman et al. | |
| 2012/0105574 A1* | 5/2012 | Baker | G03B 35/08 348/36 |
| 2012/0262607 A1* | 10/2012 | Shimura | H04N 5/2258 348/239 |
| 2013/0076900 A1* | 3/2013 | Mrozek | G02B 13/06 348/144 |
| 2013/0221226 A1* | 8/2013 | Koren | G01T 1/20 250/366 |
| 2014/0111606 A1* | 4/2014 | Cossairt | G02B 3/00 348/36 |
| 2015/0207990 A1* | 7/2015 | Ford | H04N 5/2254 348/262 |
| 2015/0281590 A1* | 10/2015 | MacMillan | G06T 3/0068 348/218.1 |

FOREIGN PATENT DOCUMENTS

| | | | |
|---|---|---|---|
| CN | 101382417 | | 3/2009 |
| CN | 101782386 | | 7/2010 |
| CN | 102679961 B | * | 4/2013 |
| CN | 103148806 | | 6/2013 |
| CN | 102447934 B | * | 9/2013 |
| CN | 103513295 | | 1/2014 |
| JP | H08285532 | | 11/1996 |
| JP | 2009/058359 | | 3/2009 |

OTHER PUBLICATIONS

Kim et al, Motion Estimation for Nonoverlapping Multicamera Rigs: Linear Algebraic and L1 Geometric Solutions, IEEE Transactions on Pattern Analysis and Machine Intelligence, vol. 32, No. X, XXXXXXX 2010.*
Jorissen, Lode, et al. "Multi-camera epipolar plane image feature detection for robust view synthesis." 3DTV-Conference: The True Vision-Capture, Transmission and Display of 3D Video (3DTV-CON), 2015. IEEE, 2015.*
Office Action (in Chinese).
Office Action (translated by EPO).

* cited by examiner

FEATURE POINT MATCHING METHOD OF PLANAR ARRAY OF FOUR-CAMERA GROUP AND MEASURING METHOD BASED ON THE SAME

CROSS REFERENCE TO RELATED APPLICATIONS

This application claims the benefit of International Application PCT/CN2016/008420 filed Jul. 4, 2016. That application is entitled "Feature-Point Three-Dimensional Measuring System of Planar Array of Four-Camera Group and Measuring Method," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present invention relates to the technical field of optical electronic measurement, and particularly to a feature point matching method of a planar array of a four-camera group and a measuring method based on the feature point matching method of the planar array of the four-camera group.

Technology in the Field of the Invention

Currently, three-dimensional stereoscopic vision measurement generally uses a line laser optical screenshot measuring technology or a manner of binocular measurement plus structured-light lighting. A main reason for wide use of the liner laser or the structured light in the three-dimensional measurement is: through indication of the line laser or the structured light, corresponding matching points are determined in a formed image, reducing matching ambiguity, and realizing decided and unique matching. However, if the indication of the line laser or the structured light is cancelled, the binocular matching cannot avoid occurrence of the ambiguity of multi-point matching, so that measurement requirements cannot be met, meanwhile using the line laser or the structured light only can measure a part imaged by the line laser or structured light, restricting an application scope of this technology, moreover use of the line laser or the structured light will have a bad effect on a measured object such as human beings.

Besides, currently, the binocular matching also usually uses a manner of attaching an identification point on a viewed object, and use of this manner also aims at improving matching accuracy. However, the manner of attaching an identification point on a viewed object has the disadvantage of conducting manual handling and intervention on the measured object in advance.

In view of this, an object of examples of the present invention is to provide a feature point matching method of a planar array of a four-camera group and a measuring method based on the feature point matching method of the planar array of the four-camera group, reducing complexity of the matching method and the measuring method, simplifying a process of calculating a spatial dimension, and reducing measuring errors of a system.

BRIEF SUMMARY OF THE INVENTION

In a first aspect, an example of the present invention provides a feature point matching method of a planar array of a four-camera group, the method comprising the following steps:

a1. taking any imaging plane of four imaging planes corresponding to four cameras of a four-camera group as a base imaging plane, and finding out, for one feature point on the base imaging plane, all matching points matching the feature point on an imaging plane adjacent to the base imaging plane in a lateral direction;

a2. for the feature point on the base imaging plane in the step a1, finding out all matching points matching the feature point on an imaging plane adjacent to the base imaging plane in a longitudinal direction;

a3. re-matching all of the matching points found out in the step a1 and all of the matching points found out in the step a2, to find out all corresponding sub-matching point groups;

a4. according to the feature point on the base imaging plane and all of the sub-matching point groups found out in the step a3, finding out matching points on an imaging plane at a diagonal position corresponding to the feature point on the base imaging plane and all of the sub-matching point groups found out in the step a3, wherein the imaging plane at the diagonal position is an imaging plane located at the diagonal position of the base imaging plane;

a5. according to the feature point on the base imaging plane, all of the sub-matching point groups found out in the step a3 and the matching points found out in the step a4, determining unique matching point groups on the four imaging planes corresponding to the same viewed point.

In conjunction with the first aspect, a first possible implementation of the first aspect above is provided in an example of the present invention, wherein in the step a1, for the feature point on the base imaging plane, all matching points matching the feature point on the imaging plane adjacent to the base imaging plane in the lateral direction are found out according to a matching condition 1), wherein the matching condition 1) is that, imaging points of one viewed point on two imaging planes adjacent in a lateral direction meet that: the imaging point of the viewed point on a left imaging plane and the imaging point of the viewed point on a corresponding right imaging plane are located on a same straight line parallel to a lateral coordinate axis, and a horizontal offset amount of the imaging point on the left imaging plane with respect to a coordinate origin of the left imaging plane is greater than a horizontal offset amount of the imaging point on the right imaging plane with respect to a coordinate origin of the right imaging plane.

In conjunction with the first aspect, a second possible implementation of the first aspect above is provided in an example of the present invention, wherein in the step a2, for the feature point on the base imaging plane in the step a1, all matching points matching the feature point on an imaging plane adjacent to the base imaging plane in a longitudinal direction are found out according to a matching condition 2), wherein the matching condition 2) is that, imaging points of one viewed point on two imaging planes adjacent in a longitudinal direction meet that: an imaging point of the viewed point on an upper imaging plane and an imaging point of the viewed point on a corresponding lower imaging plane are located on a same straight line parallel to a longitudinal coordinate axis, and a vertical offset amount of the imaging point on the upper imaging plane with respect to a coordinate origin of the upper imaging plane is greater than a vertical offset amount of the imaging point on the lower imaging plane with respect to a coordinate origin of the lower imaging plane.

In conjunction with the first aspect, a third possible implementation of the first aspect above is provided in an example of the present invention, wherein in the step a3, all of the matching points found out in the step a1 and all of the matching points found out in the step a2 are re-matched according to a matching condition 3), to exclude matching points not satisfying the matching condition 3), and the matching points satisfying the matching condition 3) are paired according to magnitudes of lateral offset values or longitudinal offset values to form sub-matching point groups, wherein the matching condition 3) is that, a corresponding matching point group of one viewed point on four imaging planes of a four-camera group meets that: a ratio of a lateral offset value to a longitudinal offset value is equal to a ratio of a length to a width of a reference rectangle, wherein the lateral offset value is a difference between a horizontal offset amount of an imaging point of the viewed point on a left imaging plane with respect to a coordinate origin of the left imaging plane and a horizontal offset amount of an imaging point of the viewed point on a corresponding right imaging plane with respect to a coordinate origin of the right imaging plane, and the longitudinal offset value is a difference between a vertical offset amount of an imaging point of the viewed point on an upper imaging plane with respect to a coordinate origin of the upper imaging plane and a vertical offset amount of an imaging point of the viewed point on a corresponding lower imaging plane with respect to a coordinate origin of the lower imaging plane, wherein the reference rectangle is a rectangle formed by four focal points of a four-camera group.

In conjunction with the first aspect, a fourth possible implementation of the first aspect above is provided in an example of the present invention, wherein in the step a4, according to the feature point on the base imaging plane and all of the sub-matching point groups found out in the step a3, a matching point on the imaging plane at the diagonal position for any sub-matching point group is found out according to the matching condition 1) and the matching condition 2), and coordinates of the matching point on the imaging plane at the diagonal position are obtained according to coordinates of the sub-matching point group found out in the step a3, wherein the matching point has a lateral coordinate equal to a lateral coordinate of a matching point on an imaging plane longitudinally adjacent to the imaging plane at the diagonal position, and a longitudinal coordinate equal to a longitudinal coordinate of a matching point on an imaging plane laterally adjacent to the imaging plane at the diagonal position, wherein after the coordinates are determined, similarity matching of image features is performed to the matching point on the imaging plane at the diagonal position and the matching points on the other three imaging planes, wherein if the matching is successful, four imaging points on the four imaging planes form a matching point group; otherwise the matching point on the imaging plane at the diagonal position and the sub-matching point group found out in the step a3 corresponding to the matching point are excluded.

In conjunction with the first aspect, a fifth possible implementation of the first aspect above is provided in an example of the present invention, wherein in the step a5, unique matching point groups on the four imaging planes corresponding to a same viewed point satisfy a matching condition 4), wherein the matching condition 4) is that, imaging points of one viewed point on the four imaging planes corresponding to the four-camera group form one rectangle, a ratio of a lateral length to a longitudinal length of the rectangle is equal to a ratio of a length to a width of a reference rectangle, and imaging points on two pairs of two imaging planes located at diagonal positions are respectively located on two straight lines parallel to two diagonal lines of the reference rectangle.

In conjunction with the first aspect, a sixth possible implementation of the first aspect above is provided in an example of the present invention, wherein in the step a5, if there is only one matching point group satisfying the matching condition 4), the matching result is unique.

In conjunction with the first aspect, a seventh possible implementation of the first aspect above is provided in an example of the present invention, wherein in the step a5, if there are a plurality of matching point groups satisfying the matching condition 4), it is to judge whether there is a base rectangle on the base imaging plane satisfying a condition as follows: the feature point is used as one vertex of the base rectangle; an extension line of a diagonal line of the base rectangle with the feature point as one vertex passes through the imaging plane at the diagonal position, and a length of the diagonal line is equal to a distance between two matching points of any two matching point groups corresponding to the feature point on the imaging plane at the diagonal position; the base rectangle is similar to the reference rectangle; and other vertices of the base rectangle are similar to the image features of the feature point, being matching points of the feature point on the base imaging plane;

if there is such a rectangle on the base imaging plane, it is to determine for any base rectangle whether there is a unique corresponding rectangle congruent to the base rectangle on the imaging plane at the diagonal position;

if yes, firstly a unique matching point corresponding to the feature point on the imaging plane at the diagonal position is determined, and then unique matching points of the feature point on the rest two imaging planes are determined according to the matching condition 1) and the matching condition 2), to exclude a matching point group having ambiguity, wherein a method of determining the unique matching point corresponding to the feature point on the imaging plane at the diagonal position is: if the feature point on the base imaging plane is one end point of one diagonal line of the base rectangle, the unique matching point on the imaging plane at the diagonal position is one of two end points on the diagonal line of the unique corresponding rectangle on the imaging plane at the diagonal position, wherein an extension line of the diagonal line passes through the feature point, if the feature point is at an upper end of the base rectangle, the unique corresponding matching point on the imaging plane at the diagonal position is a vertex at an upper end of the unique corresponding rectangle, otherwise it is a vertex at a lower end; for a non-unique matching point on the imaging plane at the diagonal position, it is able to be determined that the unique matching point of the point on the base imaging plane is another end point on the diagonal line where the feature point on the base imaging plane is located;

if no, two matching point groups corresponding to the feature point are corresponding to two different viewed points, and the two different viewed points are spatially located on an extension line of a pixel projection line of the feature point with respect to the base imaging plane;

if there is no such a rectangle on the base imaging plane, the plurality of matching point groups are corresponding to a plurality of different viewed points, and the plurality of different viewed points are spatially located on an extension line of a pixel projection line of the feature point with respect to the base imaging plane.

In conjunction with the first aspect, an eighth possible implementation of the first aspect above is provided in an example of the present invention, wherein the feature point refers to an imaging point correspondingly having one or more matching points, and the imaging point has image features different from those of other imaging points.

In a second aspect, the present invention provides a measuring method based on the feature point matching method of a planar array of a four-camera group, comprising steps as follows:

b1. after completing image acquisition, using the above-mentioned matching method to find out unique matching point groups corresponding to all of feature points on the base imaging plane;

b2. according to image coordinates of the unique matching point groups obtained in the step b1, calculating coordinates of a spatial position of a viewed point; and b3. according to coordinates of the spatial position of the viewed point obtained in the step b2, forming three-dimensional point cloud data, establishing a three-dimensional point cloud graph, and reproducing a three-dimensional stereoscopic image.

In conjunction with the second aspect, a first possible implementation of the second aspect above is provided in an example of the present invention, wherein in the step b2, if focal points of a camera a at an upper left position, a camera b at an upper right position, a camera c at a lower left position and a camera d at a lower right position of a four-camera group are Oa, Ob, Oc and Od respectively, and the four focal points are on a same plane and form one rectangle, the rectangle has a length OaOb of m and a width OaOc of n, a central point of the rectangle is set to be 0, and a three-dimensional rectangular coordinate system is set taking 0 as an origin, wherein an axis X is parallel to sides OaOb and OcOd of the rectangle, an axis Y is parallel to sides OaOc and ObOd of the rectangle, an axis Z is perpendicular to a plane where the focal points are located and is parallel to directions of optical axes of the four cameras, the four cameras have identical configuration, coordinates of a spatial position of one viewed point P of a viewed object are P(Px, Py, Pz), image coordinates of imaging points corresponding to the point P on the imaging planes of the four cameras, the camera a, the camera b, the camera c and the camera d, are Pa(Pax, Pay), Pb(Pbx, Pby), Pc(Pcx, Pcy), Pd(Pdx, Pdy) respectively, then expressions of coordinates of the spatial position of the point P are:

calculation formula for obtaining the coordinate Px in lateral matching of the imaging planes a and b $$P_x = \frac{m(P_{ax} + P_{bx} - u)}{2(P_{ax} - P_{bx})} = \frac{m(P_{ax} + P_{bx} - u)}{2\Delta x}$$

calculation formula for obtaining the coordinate Pz in the lateral matching of the imaging planes a and b $$P_z = \frac{mf}{P_{ax} - P_{bx}} = \frac{mf}{\Delta x}$$

calculation formula for obtaining the coordinate Px in lateral matching of the imaging planes c and d $$P_x = \frac{m(P_{cx} + P_{dx} - u)}{2(P_{cx} - P_{dx})} = \frac{m(P_{cx} + P_{dx} - u)}{2\Delta x}$$

calculation formula for obtaining the coordinate Pz in the lateral matching of the imaging planes c and d $$P_z = \frac{mf}{P_{cx} - P_{dx}} = \frac{mf}{\Delta x}$$

calculation formula for obtaining the coordinate Py in longitudinal matching of the imaging planes a and c $$P_y = \frac{n(P_{ay} + P_{cy} - v)}{2(P_{ay} - P_{cy})} = \frac{n(P_{ay} + P_{cy} - v)}{2\Delta y}$$

calculation formula for obtaining the coordinate Pz in the longitudinal matching of the imaging planes a and c $$P_z = \frac{nf}{P_{ay} - P_{cy}} = \frac{nf}{\Delta y}$$

calculation formula for obtaining the coordinate Py in longitudinal matching of the imaging planes b and d $$P_y = \frac{n(P_{by} + P_{dy} - v)}{2(P_{by} - P_{dy})} = \frac{n(P_{by} + P_{dy} - v)}{2\Delta y}$$

calculation formula for obtaining the coordinate Pz in the longitudinal matching of the imaging planes b and d $$P_z = \frac{nf}{P_{by} - P_{dy}} = \frac{nf}{\Delta y}$$

wherein f indicates a focal length of the four cameras, u indicates a target surface length of the image sensor, and v indicates a target surface width of the image sensor, wherein Δx is defined as a lateral offset value of an imaging point on the imaging plane b with respect to an imaging point on the imaging plane a and a lateral offset value of an imaging point on the imaging plane d with respect to an imaging point on the imaging plane c in the lateral matching, Δy is defined as a longitudinal offset value of an imaging point on the imaging plane c with respect to an imaging point on the imaging plane a and a longitudinal offset value of an imaging point on the imaging plane d with respect to an imaging point on the imaging plane b in the longitudinal matching.

The present invention at least has the following beneficial effects:

1. the feature point matching method of the planar array of the four-camera group can, according to the position of the imaging point of one viewed point on the four imaging planes of a four-camera group, quickly match to obtain a unique imaging point group on the four imaging planes corresponding to the viewed point, and realizes universal and unique matching of the viewed point which can be imaged in all of the four cameras;
2. regarding the measuring method based on the feature point matching method of the planar array of the four-camera group, under any illumination conditions, as long as the acquired image is clear enough, in cases of unknown viewed object, for any viewed object, using completely identical measuring method can realize three-dimensional measurement of the viewed object, and this measuring method does not need to make any calibration for the view field for that the measuring accuracy and resolution thereof are only related to the measuring system, irrelevant to the viewed object, and can completely realize autonomous measurement;
3. due to universality and reliability, the matching method and the measuring method facilitate program optimization and realize operations at the embedded level and the chip level, so as to quickly realize three-dimensional perception and measurement.

BRIEF DESCRIPTION OF THE DRAWINGS

In order to more clearly illustrate technical solutions of various examples of the present invention, figures which are needed for description of the examples will be introduced briefly below. It should be understood that the figures below merely show some examples of the present invention, and therefore should not be considered as limiting the scope. A person ordinarily skilled in the art still can obtain other relevant figures or examples according to these figures or examples, without paying inventive efforts.

DETAILED DESCRIPTION OF CERTAIN EMBODIMENTS

Figure 1:
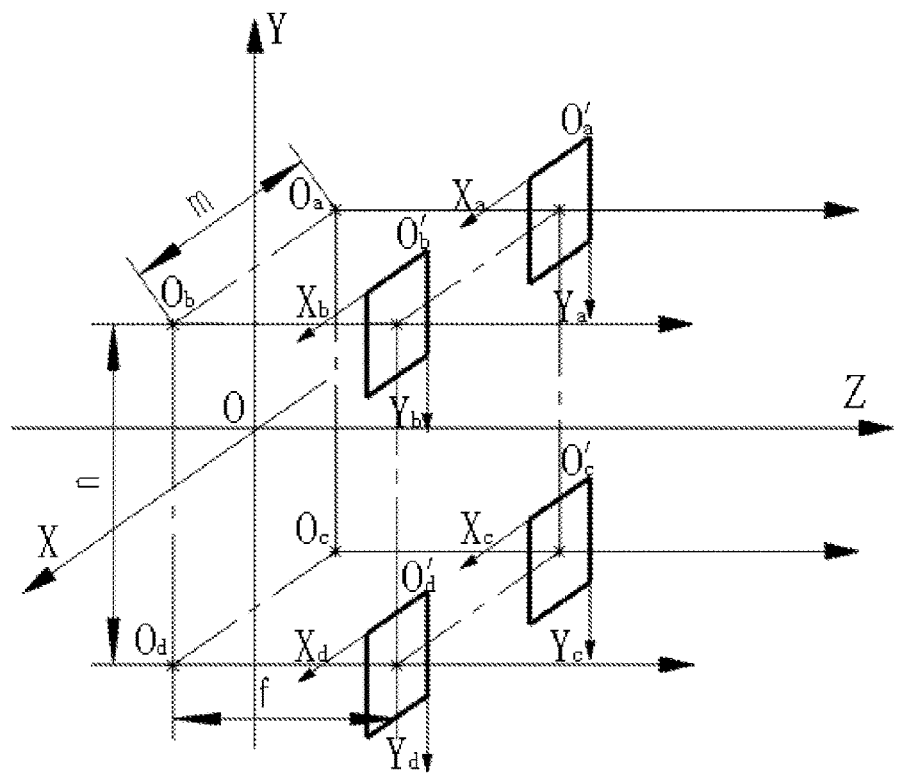
FIG. 1 is a schematic view of a spatial coordinate system established on the basis of a four-camera group.

In order to make clearer the objects, the technical solutions and the advantages of examples of the present invention, below the technical solutions in the examples of the present invention will be described clearly and completely in conjunction with figures of the examples of the present invention. Apparently, some but not all of examples of the present invention are described. Therefore, the following detailed description of the examples of the present invention provided in the figures does not aim at limiting the scope of protection of the present invention, but merely represent the chosen examples of the present invention. On the basis of the examples of the present invention, all other examples obtained by a person ordinarily skilled in the art without paying inventive efforts should fall within the scope of protection of the present invention.

In the description of the present invention, it should be understood that orientational or positional relationships indicated by terms "origin", "center", "longitudinal", "lateral", "length", "width", "depth", "upper", "lower", "front", "back", "left", "right", "upper left", "lower left", "upper right", "lower right", "vertical", "horizontal" and so on are orientational or positional relationships shown based on the figures, merely for facilitating describing the present invention and simplifying the description, rather than indicating or suggesting that related devices or elements have to be in the specific orientation or configured and operated in specific orientation, therefore, they should not be construed as limiting the present invention.

In the present invention, an imaging point refers to a formed image of a viewed point of a viewed object at a corresponding pixel position on an imaging plane (or image), and each viewed point of the viewed object has one corresponding imaging point on four imaging planes of a four-camera group respectively; a matching point refers to an imaging point, which, for an imaging point on one imaging plane, is found on this imaging plane or other imaging planes, and meets a certain matching condition of this imaging point, and has imaging features (for example, texture, color or gray level and so on) similar to those of this imaging point. One imaging point may have one or more corresponding matching points.

In the present invention, a feature point refers to the following imaging point correspondingly having one or more matching points, this imaging point having image features (for example, different texture, color or gray level value and so on, which are not specifically limited in examples of the present invention, and different image features can be selected as judgment basis according to actual situations) different from those of other imaging points. Generally, an imaging point corresponding to a viewed point at a position such as edge or texture transition area of a measured object has distinctive image features.

In the present invention, matching, matching operation and operation rule of the feature points are used to compare and analyze imaging points at two or more positions, to provide a similarity index of the image features of two or more imaging points. If the comparison result reaches a predetermined index value, the matching is successful. Different similarity indices of image features can be selected according to actual situations. In addition to matching similarity of the image features, matching conditions 1), 2), 3) and 4) and the uniqueness matching method provided in the present invention, on the basis of the current image processing method, performs the matching in accordance with the matching conditions provided in the present invention, according to geometrical positional relations between imaging points on four imaging planes of the four-camera group, so as to verify and exclude those matching ambiguous points having similar image features but wrong positional relations, ensuring uniqueness of the matching result.

1. Establishment of a Three-Dimensional Coordinate System of a Preimage Model of a Planar Array of a Four-Camera Group and Verification of Matching Conditions ① Establishment of a Three-Dimensional Measuring System and a Three-Dimensional Coordinate System of a Planar Array of a Four-Camera Group.

In order to facilitate illustrating the feature point matching method of a planar array of a four-camera group and the measuring method of the examples of the present invention, a three-dimensional measuring system of a planar array of a four-camera group and a three-dimensional coordinate system corresponding to the three-dimensional measuring system of the planar array of the four-camera group satisfying requirements need to be established. In order to make it more convenient to apply the methods of the examples of the present invention, a forward projection model is used, and the three-dimensional measuring system of the planar array of the four-camera group and the corresponding three-dimensional coordinate system are established in the following manner.

FIG. 1 is a schematic view of a spatial coordinate system established on the basis of a four-camera group. Assume that a four-camera group is arranged in a form of a 2×2 array, including four cameras with the same configuration, camera a located at an upper left position, camera b located at an upper right position, camera c located at a lower left position and camera d located at a lower right position, wherein the same configuration means that parameters such as lenses, image sensors, focal lengths and so on of the four cameras are identical. Focal points Oa, Ob, Oc, and Od of the four cameras are on the same plane, and all of optical axes of the four cameras are perpendicular to this plane. Oa, Ob, Oc, and Od form a rectangle having a length of m and a width of n, a central point of the rectangle is set to be O, and a three-dimensional rectangular coordinate system is established taking O as an origin. In the above, an axis X is parallel to sides OaOb and OcOd of the rectangle, the direction of the axis X is called as a length direction or a horizontal direction or a lateral direction, and the axis X can extend in a left-right direction (the direction shown by an arrow of the axis X is rightward, defined herein as a positive direction); an axis Y is parallel to sides OaOc and ObOd of the rectangle, the direction of the axis Y is called as a width direction or a vertical direction or a longitudinal direction, and the axis Y can extend in an up-down direction (the direction shown by an arrow of the axis Y is upward, defined herein as a positive direction); an axis Z is perpendicular to a plane where the focal points are located and is parallel to directions of the optical axes of the four cameras, and the direction of the axis Z is called as a depth direction (the direction shown by an arrow of the axis Z is defined as a positive direction of the depth direction). In the positive direction of the axis Z, a plane parallel to the plane where the focal points Oa, Ob, Oc, and Od are located and having a distance of the focal length f to this plane is set, on this plane four imaging planes a, b, c, and d are set. According to the imaging principle, a center of each imaging plane is a point through which the optical axis of respective corresponding camera passes. An origin of plane coordinates of each imaging plane is set to be an upper left corner of this imaging plane, the origins respectively being Oa', Ob', Oc' and Od', two-dimensional rectangular coordinate axis of the imaging plane a is set to be Oa'XaYa, two-dimensional rectangular coordinate axis of the imaging plane b is set to be Ob'XbYb, two-dimensional rectangular coordinate axis of the imaging plane c is set to be Oc'XcYc, and two-dimensional rectangular coordinate axis of the imaging plane d is set to be Od'XdYd. Moreover, each imaging plane is set to have a length (corresponding to a target surface length of an image sensor of respective camera) of u, and a width (corresponding to a target surface width of the image sensor of respective camera) of v (not shown in the figure).

One four-camera group (i.e. a planar array of a four-camera group) using the above-mentioned arrangement structure provided in the present invention is a smallest basic three-dimensional measuring unit, a three-dimensional measuring system of a planar array of a multiple-camera group formed by more cameras (2N cameras, wherein N is a positive integer greater than or equal to 2) can be constructed according to similar rules and methods, meanwhile according to similar rules and methods, a three-dimensional measuring system corresponding to respective four-camera group can be constructed, or a uniform three-dimensional coordinate system can be constructed. The matching method and the measuring method of the examples of the present invention are applicable to matching and measurement of a three-dimensional coordinate position of a viewed point of a measured object which can be imaged on all of four cameras of one four-camera group arranged as the above.

For facilitating the description, the rectangle formed by the four focal points of one four-camera group is called as a reference rectangle. Meanwhile, the imaging plane a and the imaging plane d are imaging planes at diagonal positions to each other, and the imaging plane b and the imaging plane c are imaging planes at diagonal positions to each other.

② Lateral Matching and Longitudinal Matching of the Feature Point of the Planar Array of the Four-Camera Group and Calculation of Coordinates of a Spatial Position of the Feature Point.

Figure 2:
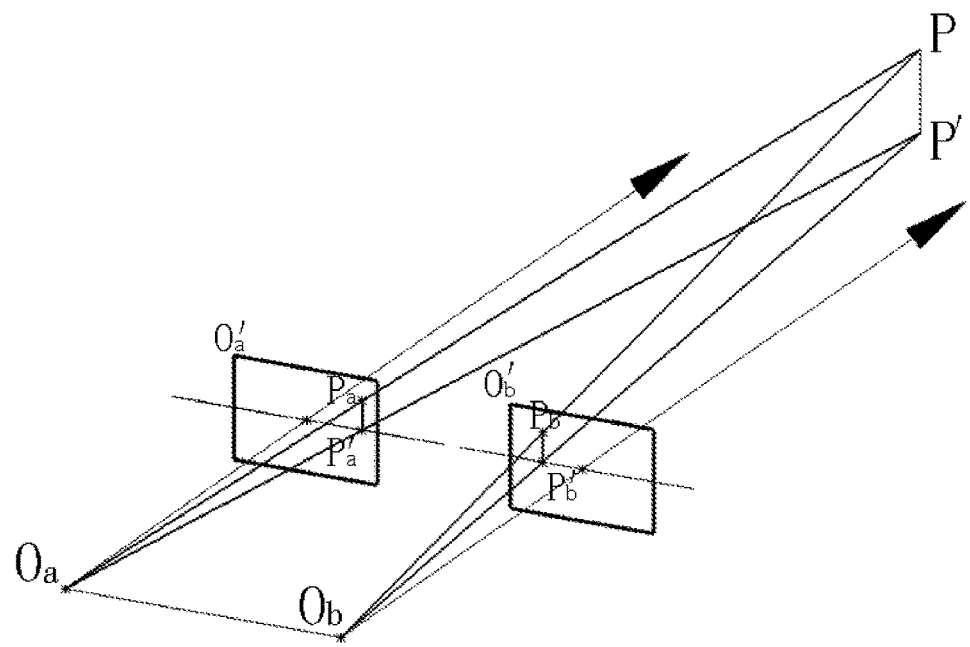
FIG. 2 is a projection schematic view of a certain viewed point of a viewed object and imaging points of this viewed point on imaging planes of two cameras of a four-camera group in a lateral direction.

FIG. 2 is a projection schematic view of a certain viewed point P of a viewed object and imaging points of this point on the imaging plane a and the imaging plane b. Referring to FIG. 2, according to the imaging principle, imaging points of the point P on the imaging planes a and b are Pa and Pb respectively, and projections of the point P, the point Pa, and the point Pb on a plane where the two focal points Oa and Ob are located and which is parallel to an OXZ coordinate plane are point P', point Pa', and point Pb' respectively.

Since a straight line OaOb is parallel to an imaging plane formed by two imaging planes a and b, a triangle formed by three points, i.e. the point P, the point Oa and the point Ob, intersects with a plane where the two imaging planes a and b are located, an intersecting line being a straight line PaPb, therefore the straight line PaPb and the straight line OaOb are parallel.

Figure 3:
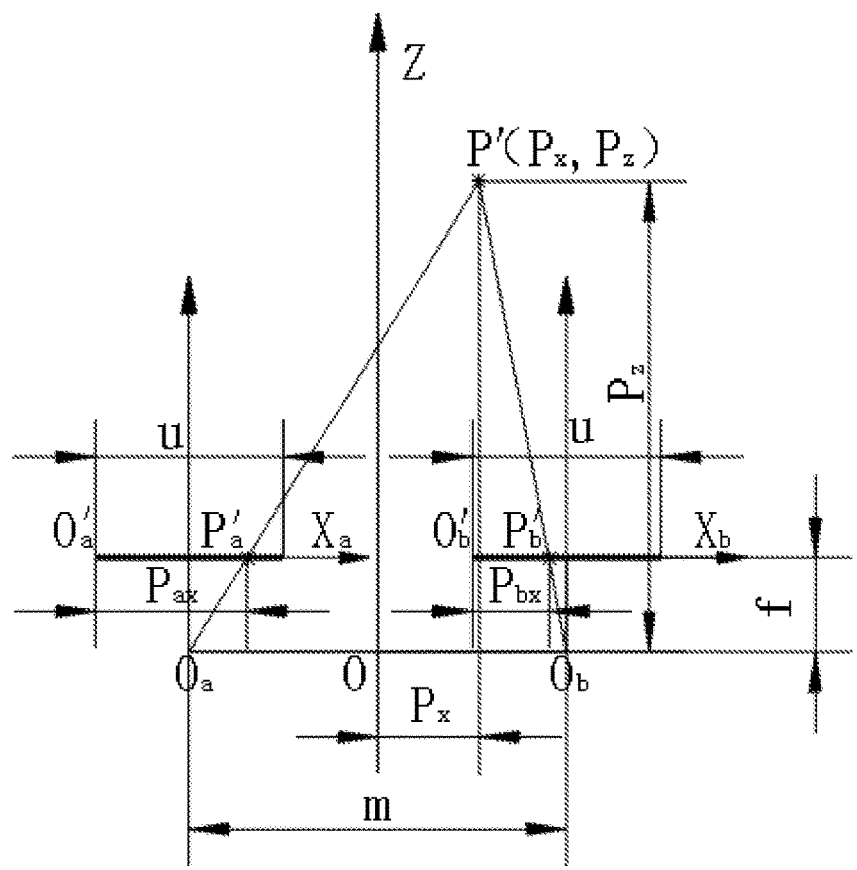
FIG. 3 is a projection schematic view of the viewed point and corresponding imaging points in FIG. 2 on an OXZ coordinate plane.

FIG. 3 is a projection schematic view of the point P, the point Pa and the point Pb in FIG. 2 on the OXZ coordinate plane.

Referring to FIG. 3, m indicates the length of OaOb, u indicates the target surface length of respective image sensor, the point P', the point Pa' and the point Pb' respectively are projection points of the point P, the point Pa and the point Pb on the OXZ coordinate plane, and Pax and Pbx respectively are coordinate values of the point Pa' and the point Pb' on the imaging plane a and the imaging plane b in the axis-X direction.

Apparently, Pax is greater than Pbx, that is to say, a horizontal offset amount of the imaging point of the point P on the imaging plane a with respect to a coordinate origin of the imaging plane a is greater than a horizontal offset amount of an imaging point of this point on the imaging plane b with respect to coordinate origin of the imaging plane b.

Therefore, the following matching conditions are obtained:

matching condition 1): when one viewed point is imaged on four imaging planes of a four-camera group, imaging points on two imaging planes adjacent in a lateral direction meet that: the imaging point of this viewed point on a left imaging plane and the imaging point of this viewed point on a corresponding right imaging plane are located on a same straight line parallel to a lateral coordinate axis, and a horizontal offset amount of the imaging point on the left imaging plane with respect to a coordinate origin of the left imaging plane is greater than a horizontal offset amount of the imaging point on the right imaging plane with respect to a coordinate origin of the right imaging plane.

The matching condition 1) is applicable to the lateral matching of the imaging planes a and b, likewise also applicable to the lateral matching of the imaging planes c and d. Two imaging planes adjacent in a lateral direction of a four-camera group are corresponding left plane and right plane, that is, the right imaging plane corresponding to the left imaging plane a is b, and the right imaging plane corresponding to the left imaging plane c is d.

Likewise, the following matching condition can be obtained:

matching condition 2): when one viewed point is imaged on four imaging planes of a four-camera group, the imaging points on two imaging planes adjacent in a longitudinal direction meet that: an imaging point of this viewed point on an upper imaging plane and an imaging point of this viewed point on a corresponding lower imaging plane are located on a same straight line parallel to a longitudinal coordinate axis, and a vertical offset amount of the imaging point on the upper imaging plane with respect to a coordinate origin of this upper imaging plane is greater than a vertical offset amount of the imaging point on the lower imaging plane with respect to a coordinate origin of this lower imaging plane.

The matching condition 2) is applicable to the longitudinal matching of the imaging planes a and c, likewise also applicable to the longitudinal matching of the imaging planes b and d. Two imaging planes adjacent in a longitudinal direction of a four-camera group are corresponding upper plane and lower plane, that is, a lower imaging plane corresponding to the upper imaging plane a is c, and a lower imaging plane corresponding to the upper imaging plane b is d.

Based on the above-mentioned contents and the triangle similarity principle, for FIG. 3, the following is obtained:

$$\frac{P_z}{f} = \frac{\frac{m}{2} + P_x}{P_{ax} - \frac{u}{2}} \quad \text{①}$$

$$\frac{P_z}{f} = \frac{\frac{m}{2} - P_x}{\frac{u}{2} - P_{bx}} \quad \text{②}$$

According to ① and ②, it is deduced that $$\frac{\frac{m}{2} + P_x}{P_{ax} - \frac{u}{2}} = \frac{\frac{m}{2} - P_x}{\frac{u}{2} - P_{bx}}$$

$$\left(\frac{u}{2} - P_{bx}\right) \times \left(\frac{m}{2} + P_x\right) = \left(\frac{m}{2} - P_x\right) \times \left(P_{ax} - \frac{u}{2}\right)$$

$$\frac{u}{2} \times \frac{m}{2} - \frac{m}{2} P_{bx} + \frac{u}{2} P_x - P_{bx} P_x = \frac{m}{2} P_{ax} - P_x P_{ax} - \frac{u}{2} \times \frac{m}{2} + \frac{u}{2} \times P_x$$

$$P_x = \frac{m(P_{ax} + P_{bx} - u)}{2(P_{ax} - P_{bx})} \quad \text{③}$$

$$P_z = \frac{mf}{P_{ax} - P_{bx}} \quad \text{④}$$

(Pax−Pbx) is defined as a lateral offset value of the imaging point on the imaging plane b with respect to the imaging point on the imaging plane a in the lateral matching, defined as Δx. Then, the following can be obtained:

calculation formula (formula 1) of coordinate Px in the lateral matching of the imaging planes a and b:

$$P_x = \frac{m(P_{ax} + P_{bx} - u)}{2(P_{ax} - P_{bx})} = \frac{m(P_{ax} + P_{bx} - u)}{2\Delta x}$$

calculation formula (formula 2) of coordinate Pz in the lateral matching of the imaging planes a and b:

$$P_z = \frac{mf}{P_{ax} - P_{bx}} = \frac{mf}{\Delta x}$$

Likewise, calculation formulas of coordinates in the lateral matching of the imaging planes c and d can be deduced:

calculation formula (formula 3) of coordinate Px in the lateral matching of the imaging planes c and d:

$$P_x = \frac{m(P_{cx} + P_{dx} - u)}{2(P_{cx} - P_{dx})} = \frac{m(P_{cx} + P_{dx} - u)}{2\Delta x}$$

calculation formula (formula 4) of coordinate Pz in lateral matching of the imaging planes c and d:

$$P_z = \frac{mf}{P_{cx} - P_{dx}} = \frac{mf}{\Delta x}$$

That is, (Pax−Pbx)=(Pcx−Pdx)=Δx, and (Pcx−Pdx) is a lateral offset value of an imaging point on the imaging plane d with respect to an imaging point on the imaging plane c in the lateral matching.

Similar to the lateral matching, calculation formulas of coordinates in the longitudinal matching also can be deduced, and (Pay−Pcy) is defined as a longitudinal offset value of an imaging point on the imaging plane c with respect to an imaging point on the imaging plane a in the longitudinal matching, defined as Δy.

Calculation formula (formula 5) of coordinate Py in the longitudinal matching of the imaging planes a and c:

$$P_y = \frac{n(P_{ay} + P_{cy} - v)}{2(P_{ay} - P_{cy})} = \frac{n(P_{ay} + P_{cy} - v)}{2\Delta y}$$

Calculation formula (formula 6) of coordinates of Pz in the longitudinal matching of the imaging planes a and c:

$$P_z = \frac{nf}{P_{ay} - P_{cy}} = \frac{nf}{\Delta y}$$

Calculation formula (formula 7) of coordinate Py in the longitudinal matching of the imaging planes b and d:

$$P_y = \frac{n(P_{by} + P_{dy} - v)}{2(P_{by} - P_{dy})} = \frac{n(P_{by} + P_{dy} - v)}{2\Delta y}$$

Calculation formula (formula 8) of coordinate Pz in longitudinal matching of the imaging planes b and d:

$$P_z = \frac{nf}{P_{by} - P_{dy}} = \frac{nf}{\Delta y}$$

That is, (Pay−Py)=(Pby−Pdy)=Δy, (Pby−Pdy) is a longitudinal offset value of an imaging point on the imaging plane d with respect to an imaging point on the imaging plane b in the longitudinal matching.

③ Further Extension of the Lateral Matching and the Longitudinal Matching of the Feature Point of the Planar Array of the Four-Camera Group.

For the same viewed point, according to the formula 2, the formula 4, the formula 6 and the formula 8, the following can be deduced:

$$\frac{mf}{Dx} = \frac{nf}{Dy}$$

Further the following formula (formula 9) is obtained:

$$\frac{Dx}{Dy} = \frac{m}{n}$$

Thus, the following matching condition is obtained:
matching condition 3): a matching point group or a sub matching point group corresponding to one viewed point on four imaging planes of a four-camera group meets that: a ratio of a lateral offset value to a longitudinal offset value is equal to a ratio of the length to the width of the reference rectangle, wherein the lateral offset value is a difference between a horizontal offset amount of an imaging point of this viewed point on a left imaging plane with respect to a coordinate origin of this left imaging plane and a horizontal offset amount of an imaging point of this viewed point on a corresponding right imaging plane with respect to a coordinate origin of this right imaging plane, and the longitudinal offset value is a difference between a vertical offset amount of an imaging point of this viewed point on an upper imaging plane with respect to a coordinate origin of this upper imaging plane and a vertical offset amount of an imaging point of this viewed point on a corresponding lower imaging plane with respect to a coordinate origin of this lower imaging plane, wherein the matching point group refers to four imaging points on the four imaging planes and meeting the matching condition 3) and having similar image features, and the sub matching point group specifically refers to imaging points on two imaging planes adjacent to the base imaging plane and meeting the matching condition 3).

Figure 4:
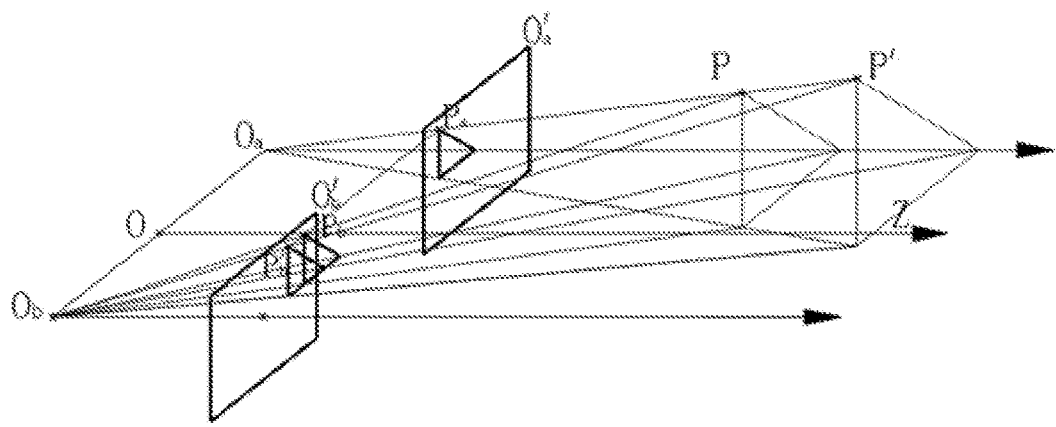
FIG. 4 is a perspective schematic view of occurrence of ambiguous points when two laterally adjacent imaging planes of a four-camera group perform lateral matching.

2. Uniqueness Verification of the Feature Point Matching Method of the Planar Array of the Four-Camera Group Unique matching of the feature point can be realized using the matching method of the planar array of the four-camera group. This matching method has good universality and applicability, proved as follows:

Firstly, FIG. 4 is a perspective schematic view merely showing occurrence of ambiguous points when the imaging planes a and b perform the lateral matching. Referring to FIG. 4, a point P is a viewed point of a measured object in a space, with coordinates of P(Px, Py, Pz), and imaging points of the viewed point on the imaging planes a and b are Pa and Pb respectively. When the matching operation is performed, assume that the point Pa is a datum point (a feature point), an imaging point on the imaging plane b matching this point is looked for. After the point Pa is determined, according to the matching condition 1), the imaging point on the imaging plane b and matching the point Pa is located on a straight line passing through the point Pa and parallel to the axis X, and a horizontal coordinate value of this matching imaging point on the imaging plane b is smaller than a horizontal coordinate value of the point Pa on the imaging plane a. For the point Pa, once its position on the imaging plane a is determined, the viewed point corresponding to the point Pa is located on an extension line of a ray (or called as a pixel projection line, i.e., a ray determined by a focal point of one camera and any imaging point) where OaPa is located. The matching between the imaging planes a and b belongs to binocular matching. According to currently known operation rule, operation method and constraint condition of the binocular matching, when the image feature of the point Pa is known, generally there will not be only one but a plurality of matching imaging points of this point on the imaging plane b determined thereby, thus resulting in occurrence of a problem of the uniqueness of the binocular matching. The problem which currently needs to be addressed is to eliminate one or more points having ambiguity from a plurality of matching points meeting the matching conditions, to determine the imaging point Pb on the imaging plane b uniquely matching the point Pa.

For this reason, assume that a point Pb' is another imaging point on the imaging plane b and matching the point Pa, according to the matching condition 1), this point is located on the same straight line as PaPb, and a ray determined by a line connecting this point and Ob and a ray where OaPa is located are on the same plane and the two rays intersect, and an intersection point is set to be a point P'. Therefore, the point Pb' also can be regarded as an imaging point of the point P' on the imaging plane b, and this point is also corresponding to the point Pa on the imaging plane a.

Figure 5:
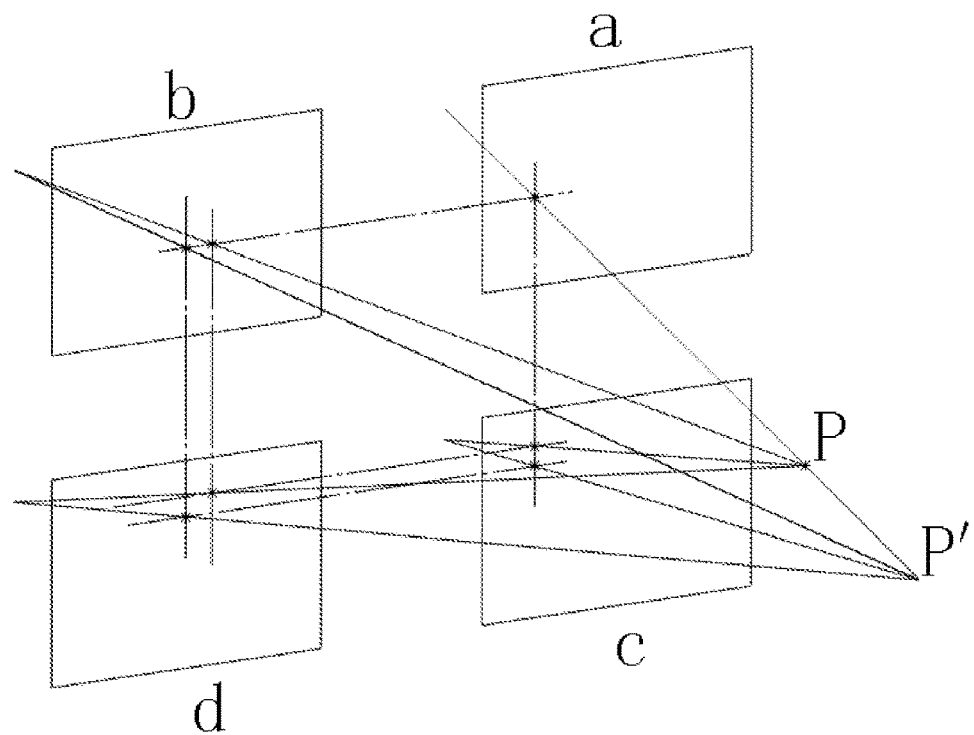
FIG. 5 is a perspective schematic view of imaging of one ideal straight line on four imaging planes of a four-camera group.
Figure 6:
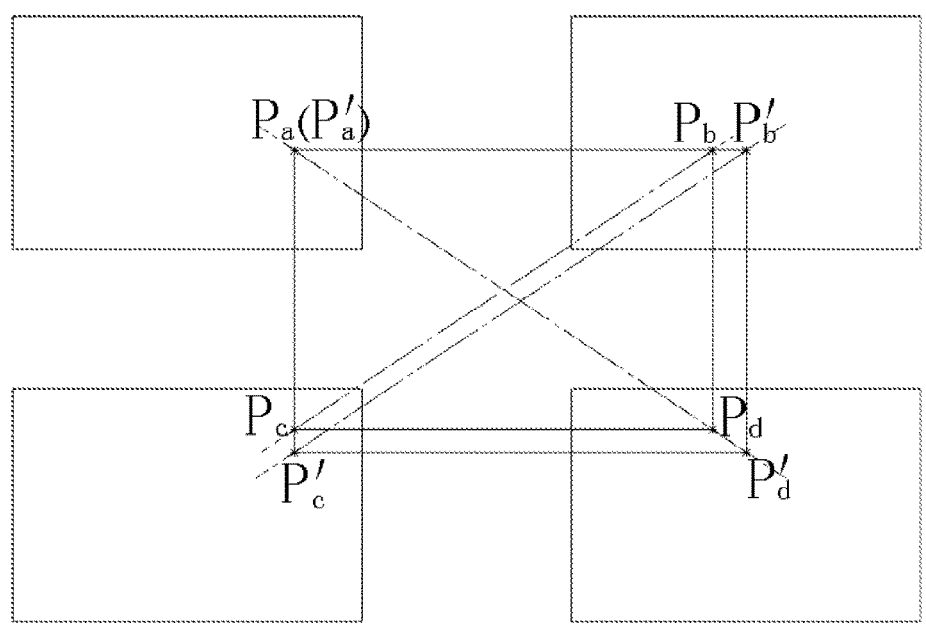
FIG. 6 is a plan schematic view of imaging points on the four imaging planes of FIG. 5.

FIG. 5 is a perspective schematic view of imaging of one ideal straight line PP' on four imaging planes; FIG. 6 is a plan schematic view of imaging points on the four imaging planes of FIG. 5. Referring to FIG. 5 and FIG. 6, imaging points of the point P and the point P' on the imaging plane c and the imaging plane d can be seen, wherein the imaging points Pa and Pa' of the point P and the point P' on the imaging plane a coincide. The point Pa, the point Pb, the point Pc and the point Pd (Pa, Pb, Pc and Pd) form a matching point group corresponding to the point P, which is a unique matching point group corresponding the point P; the point Pa', the point Pb', the point Pc' and the point Pd' (Pa', Pb', Pc' and Pd') form a matching point group corresponding to the point P', which is a unique matching point group corresponding the point P'.

The uniqueness of the matching algorithm of the planar array of the four-camera group lies in that, according to the matching conditions, Pa is taken as a datum point, to find out the unique matching imaging points thereof on the imaging planes b, c, and d respectively. Firstly, the matching imaging point Pb and arbitrarily assumed another matching imaging point Pb' are found on the imaging plane b. If both imaging points are matching points of Pa, according to the image imaging principle, the imaging points as shown in FIG. 5 are obtained on the imaging planes a, b, c, and d. It also can be deduced that Pa(Pa'), PbPb', PcPc', and PdPd' in FIG. 6 are projection images of the straight line PP' on the four imaging planes, wherein Pa and Pa' coincide.

If there is an ideal straight line same as or similar to PP' in FIG. 5, imaging points of this straight line on the four imaging planes of a four-camera group are as shown in FIG. 5 and FIG. 6. PP' is merely an example. In fact, the imaging points of all viewed points between P and P' on the imaging plane a are the point Pa, in other words, for this situation, if the imaging plane a is taken as a base imaging plane, the point Pa is corresponding to multiple groups of matching points, but each group of matching points is corresponding to a unique viewed point.

According to FIG. 6, in conjunction with a formula 9:

$$\frac{Dx}{Dy} = \frac{m}{n}$$

the following can be obtained:
matching condition 4): the imaging points of one viewed point on the four imaging planes of the four-camera group form one rectangle, a ratio of a lateral length to a longitudinal length of the rectangle is equal to a ratio of a length to a width of the reference rectangle, and the imaging points on two pairs of two imaging planes located at diagonal positions are respectively located on two straight lines parallel to two diagonal lines of the reference rectangle.

According to the above contents, it can be obtained that when a straight line similar to PP' appears as for a viewed object, if the matching of a single point corresponding to multiple points appears when the binocular matching is performed for the imaging planes a and b, requirements of unique matching cannot be satisfied, thus producing matching ambiguity. But if the imaging planes c and d are taken as reference for matching of the imaging planes a and b, especially on the imaging plane d, the straight line PP' becomes an inclined straight line, then a unique matching point of P' on each imaging plane, and a unique matching point group corresponding to each point on the straight line PP' can be found out on the four imaging planes, further coordinates of a spatial location of a point on the straight line PP' can be calculated according to the above-mentioned coordinate calculation formulas. This is just similar to the case that mechanical drawing needs three orthographic views, because ambiguous understanding of an object will occur with two views, but such situation will not take place with three orthographic views.

Figure 7:
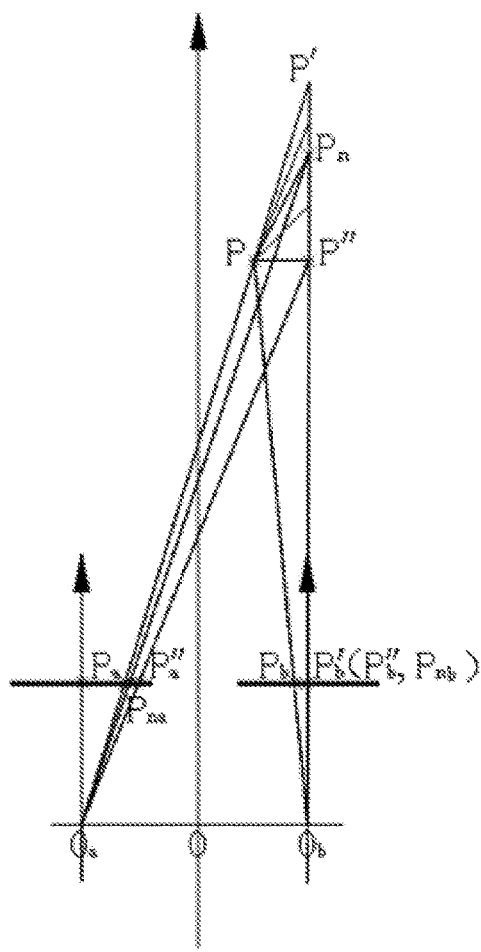
FIG. 7 is a projection schematic view demonstrating matching uniqueness.
Figure 8:
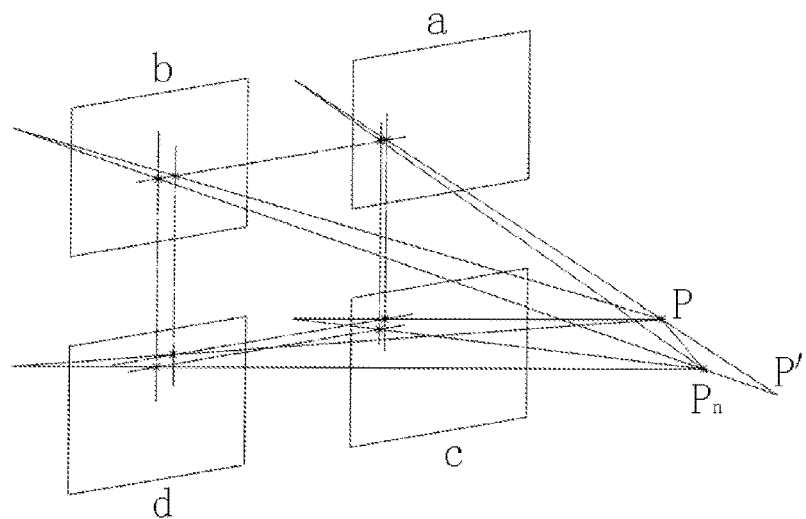
FIG. 8 is an exemplary perspective schematic view demonstrating matching uniqueness.

In order to further prove the matching uniqueness, the following situations are taken into consideration:

first situation: assume that the point Pb' is another point on the imaging plane b whose image feature matches the image feature of the point Pa, meanwhile the point Pb' is not a projection imaging point of the point P' on the imaging plane b, but another arbitrary point in the space capable of creating a projection imaging point Pb' on the imaging plane b, set as a point Pn. FIG. 7 is a projection schematic view demonstrating matching uniqueness. With reference to FIG. 7, imaging points of the point P', the point Pn and the point P''' on the imaging plane b coincide. According to the imaging principle, a perspective schematic view of projection of the point Pn on the four imaging planes is as shown in FIG. 8. If the projection points of the point Pn on the imaging planes a, b, c and d are set to be Pna, Pnb, Pnc and Pnd respectively, FIG. 9 shows the imaging points of the point P and the point Pn on the imaging planes a, b, c and d.

Figure 9:
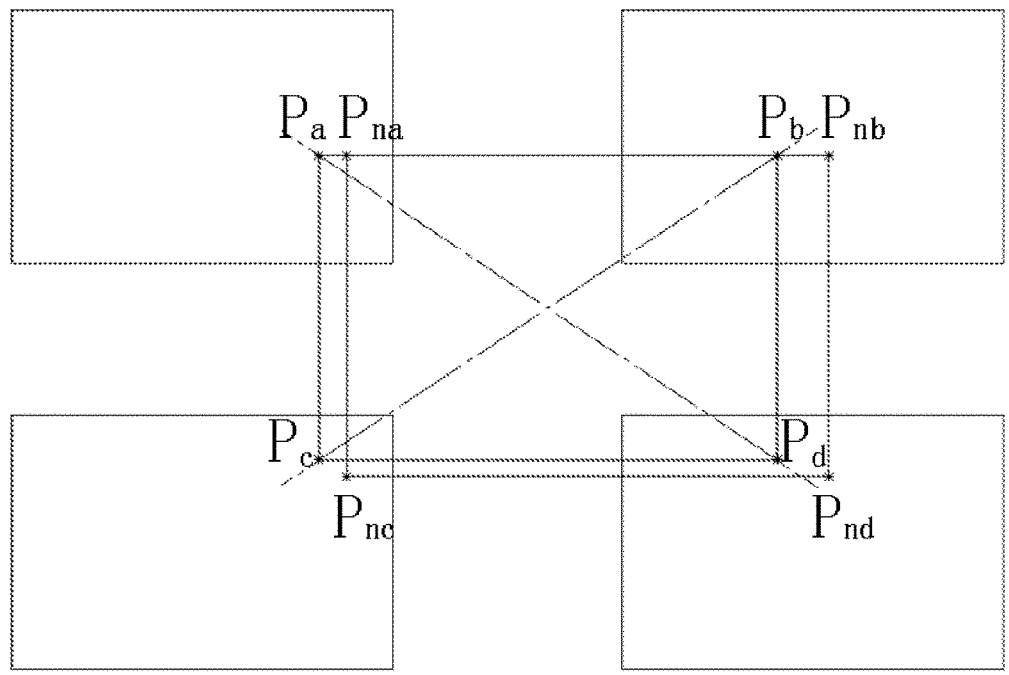
FIG. 9 is a plan schematic view of the imaging points on the four imaging planes in FIG. 8.

According to the feature point matching method of the planar array of the four-camera group, it can be seen from FIG. 9 that the point Pnc and the point Pa are not on the same longitudinal straight line, not satisfying the matching condition 2), and the point Pnd and the point Pa are not on the straight line parallel to the diagonal line of the rectangle formed by the focal points of the four-camera group, not satisfying the matching condition 4). Therefore, although ambiguous matching imaging points Pb' and Pnb appear in the binocular matching, according to the feature point matching method of the planar array of the four-camera group, it can be determined that arbitrarily assumed another matching point Pnd is not an imaging point matching the imaging point of the point P on the imaging plane a. In this situation, using the feature point matching method of the planar array of the four-camera group can effectively eliminate ambiguity easily appearing in the binocular matching.

Figure 10:
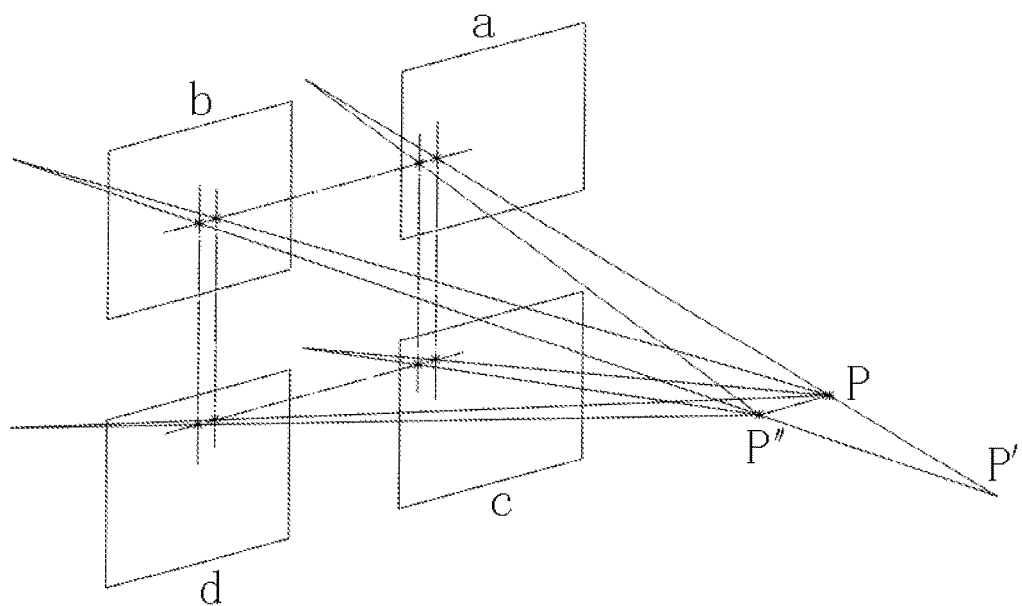
FIG. 10 is another exemplary perspective schematic view demonstrating matching uniqueness.

Second situation: assume that the point Pb' is not a projection of the point P' on the imaging plane b, but specifically is a projection of any point P''' on the straight line PP''' parallel to the straight line OaOb on the imaging plane b, set as Pb''. FIG. 10 shows a perspective schematic view of projections of the point P''' on four imaging planes, and FIG. 11 shows respective imaging points of the point P and the point P''' on the imaging planes a, b, c and d, wherein the point Pb'' and the point Pn coincide.

Figure 11:
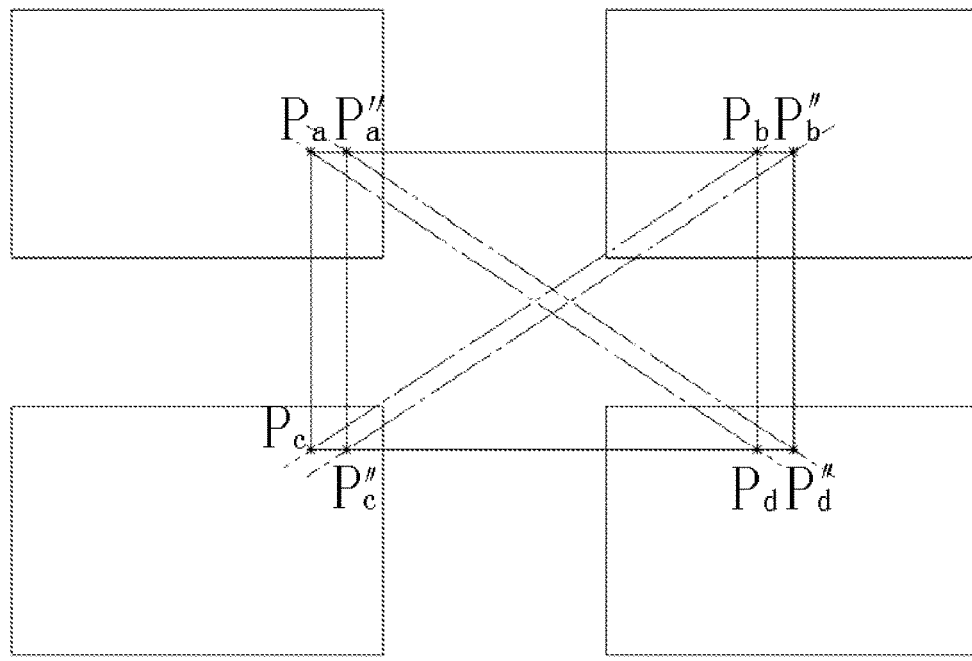
FIG. 11 is a plan schematic view of the imaging points on the four imaging planes in FIG. 10.

According to the feature point matching method of the planar array of the four-camera group, it can be seen from FIG. 11 that the point Pc'' and the point Pa are not on one longitudinal straight line, not satisfying the matching condition 2), and the point Pd'' and the point Pa are not on one straight line parallel to the diagonal line of the rectangle formed by the focal points of the four-camera group, not satisfying the matching condition 4). Therefore, it can be determined that imaging point of any another point P''' on the straight line PP″ parallel to the straight line OaOb on the imaging plane b is not an imaging point matching the imaging point of the point P on the imaging plane a.

Figure 12:
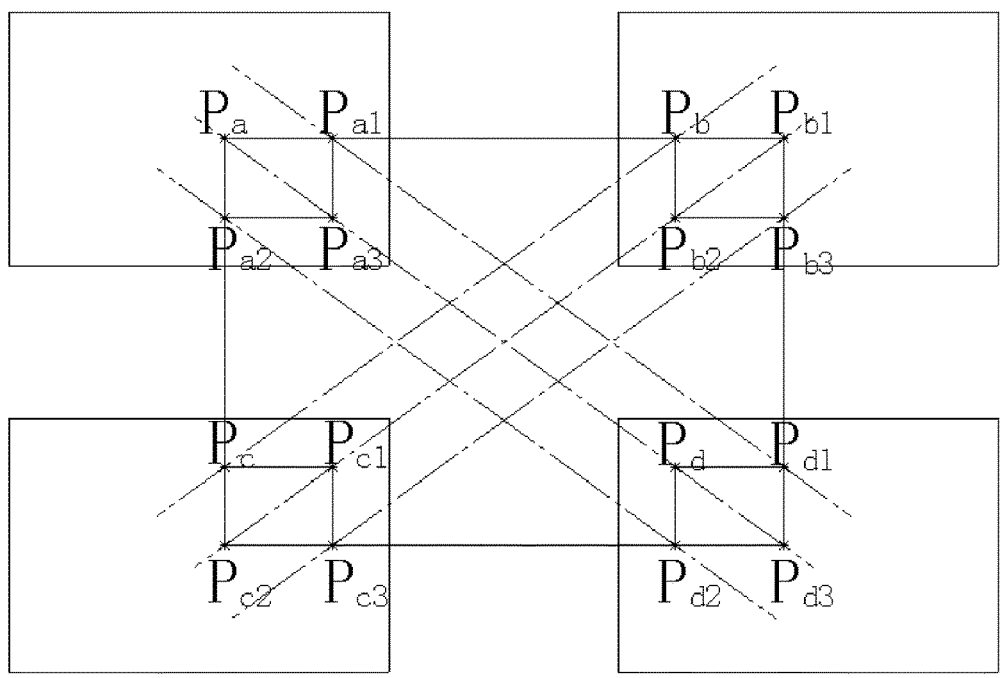
FIG. 12 is another exemplary plan schematic view demonstrating matching uniqueness.

However, if assume that there is a plane parallel to the rectangle formed by the focal points of the four-camera group, there are four viewed points P, P1, P2, and P3 having similar image features on this plane, and the four viewed points are arranged to form a rectangle having similar dimension to the rectangle, as shown in FIG. 12, then, if a matching point corresponding to the point P is looked for, the point P3 also satisfies the feature point matching conditions of the planar array of the four-camera group, which is a further specific consideration in the second situation.

That is, in fact, the matching point groups corresponding to the viewed points P, P1, P2 and P3 are (Pa, Pb, Pc and Pd), (Pa1, Pb1, Pc1 and Pd1), (Pa2, Pb2, Pc2 and Pd2) and (Pa3, Pb3, Pc3 and Pd3), however, due to the existence of the point P3, among the plurality of matching point groups found out according to the matching method for the point P, apart from (Pa, Pb, Pc and Pd), there is still an ambiguous matching point group (Pa, Pb1, Pc2 and Pd3).

If this situation takes place, four points Pa, Pa1, Pa2 and Pa3 corresponding to the viewed points P, P1, P2 and P3 can be found on the imaging plane a, wherein (Pa, Pa1, Pa2 and Pa3), (Pb, Pb1, Pb2 and Pb3), (Pc, Pc1, Pc2 and Pc3) and (Pd, Pd1, Pd2 and Pd3) respectively form a rectangle similar to the rectangle formed by the focal points of the four-camera group.

An ambiguous matching point group can be found out using the following manner, that is, with regard to the above-mentioned situation, according to the matching conditions, a plurality of matching point groups (Pa, Pb, Pc and Pd) and (Pa, Pb1, Pc2 and Pd3) are found for the imaging point Pa on the base image plane, then there is a rectangle PaPa1Pa2Pa3 on the imaging plane a taking the point Pa as an upper left vertex and similar to the reference rectangle; further, it only needs to determine that there is a unique corresponding rectangle Pa3Pb3Pc3Pd3 congruent to the rectangle PaPa1Pa2Pa3 on the imaging plane d, then it can be determined that the unique matching point corresponding to Pa is Pd, the unique matching point corresponding to Pa3 is Pd3, and the ambiguous matching point group is excluded.

Similarly, for the situation where the imaging plane b, c or d is taken as a base imaging plane, a similar way of reasoning can be used, to exclude one or more ambiguous matching point groups found out.

In the examples of the present invention, the viewed points capable of being imaged on the four imaging planes of a four-camera group are matched according to the matching conditions, so as to obtain coordinates of a spatial location of the viewed point, forming three-dimensional point cloud data, and further a three-dimensional point cloud graph can be established, for performing three-dimensional reproduction of the viewed object. Due to the uniqueness property of matching of the four-camera group, the coordinates of the spatial location of the viewed point are also unique, and one-to-many or many-to-one ambiguity will not appear.

Figure 13:
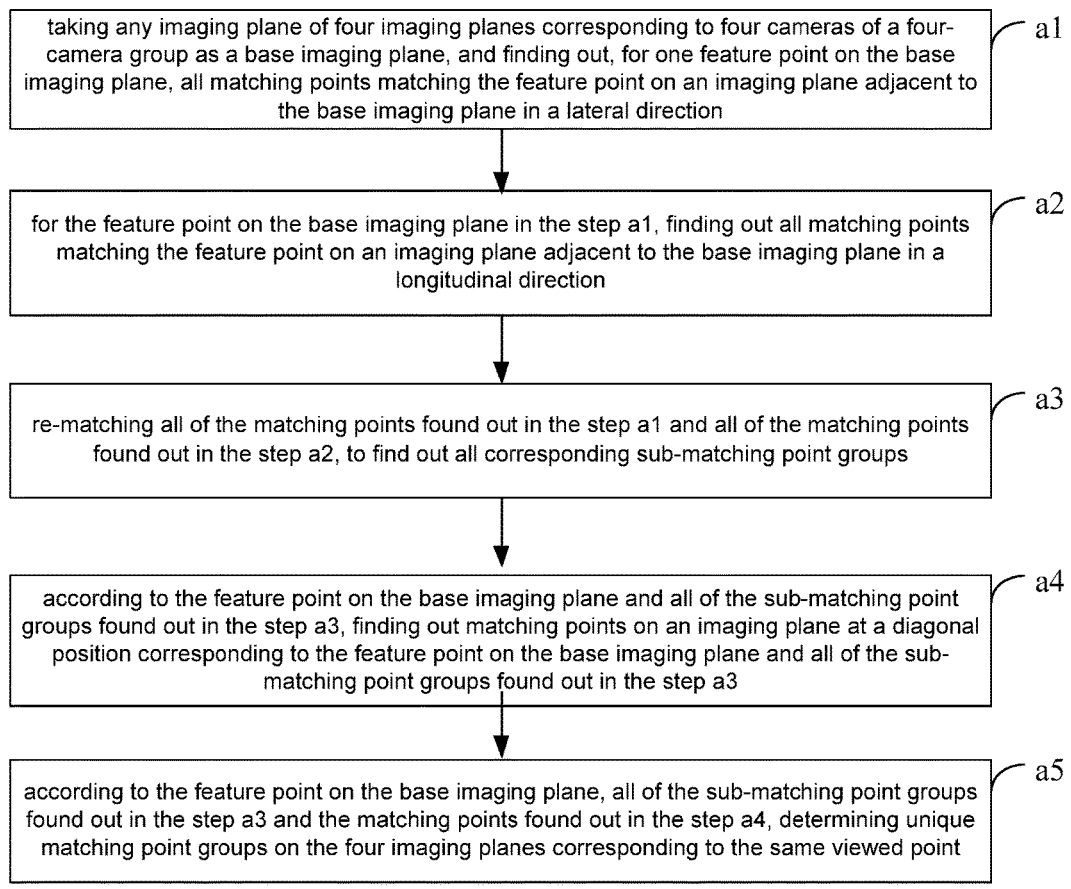
FIG. 13 is a flow chart of a feature point matching method of a planar array of a four-camera group of an example of the present invention.

3. The Feature Point Matching Method of the Planar Array of the Four-Camera Group and the Measuring Method According to the preceding matching principles, matching conditions, matching formulas and matching methods, on one hand, with reference to FIG. 13, a feature point matching method of a planar array of a four-camera group comprises the following steps:

a1. taking any imaging plane of four imaging planes corresponding to four cameras of a four-camera group as a base imaging plane, and finding out, for one feature point on the base imaging plane, all matching points matching this feature point on an imaging plane adjacent to this base imaging plane in a lateral direction, wherein in the step a1, for the feature point on the base imaging plane, all matching points matching this feature point on the imaging plane adjacent to this base imaging plane in the lateral direction are found out according to the matching condition 1);

a2. for the feature point on the base imaging plane in the step a1, finding out all matching points matching this feature point on an imaging plane adjacent to this base imaging plane in a longitudinal direction, wherein in the step a2, for the feature point on the base imaging plane in the step a1, all matching points matching this feature point on an imaging plane adjacent to this base imaging plane in a longitudinal direction are found out according to the matching condition 2);

a3. re-matching all of the matching points found out in the step a1 and all of the matching points found out in the step a2, to find out all corresponding sub-matching point groups, in the step a3, all of the matching points found out in the step a1 and all of the matching points found out in the step a2 are re-matched according to the matching condition 3), to exclude matching points not satisfying the matching condition 3), and the matching points satisfying the matching condition 3) are paired according to magnitudes of lateral offset values or longitudinal offset values to form sub-matching point groups;

a4. according to the feature point on the base imaging plane and all of the sub-matching point groups found out in the step a3, finding out matching points on an imaging plane at a diagonal position corresponding to the feature point on the base imaging plane and all of the sub-matching point groups found out in the step a3, wherein the imaging plane at the diagonal position is an imaging plane located at the diagonal position of the base imaging plane, wherein in the step a4, according to the feature point on the base imaging plane and all of the sub-matching point groups found out in the step a3, finding out a matching point on the imaging plane at the diagonal position for any sub-matching point group according to the matching condition 1) and the matching condition 2) is found out, and coordinates of the matching point on the imaging plane at the diagonal position are obtained according to coordinates of the sub-matching point groups found out in the step a3, wherein the matching point has a lateral coordinate of the matching point equal to a lateral coordinate of a matching point on an imaging plane longitudinally adjacent to the imaging plane at the diagonal position, and a longitudinal coordinate equal to a longitudinal coordinate of a matching point on an imaging plane laterally adjacent to the imaging plane at the diagonal position, wherein after the coordinates are determined, similarity matching of image features is performed to the matching point on the imaging plane at the diagonal position and the matching points on the other three imaging planes, wherein if the matching is successful, four imaging points on the four imaging planes form a matching point group; otherwise the matching point on the imaging plane at the diagonal position and the matching point group found out in the step a3 corresponding to the matching point are excluded;

a5. according to the feature point on the base imaging plane, all of the sub-matching point groups found out in the step a3 and the matching point found out in the step a4, determining unique matching point groups on the four imaging planes corresponding to the same viewed point, wherein in the step a5, unique matching point groups on the four imaging planes corresponding to a same viewed point satisfy the matching condition 4), wherein the matching condition 4) is that, imaging points of one viewed point on the four imaging planes corresponding to the four-camera group form one rectangle, a ratio of the lateral length to the longitudinal length of the rectangle is equal to the ratio of the length to the width of the reference rectangle, and the imaging points on two pairs of two imaging planes located at the diagonal positions are respectively located on two straight lines parallel to two diagonal lines of the reference rectangle, in the step a5, if there is only one matching point group satisfying the matching condition 4), the matching result is unique;

in the step a5, if there are a plurality of matching point groups satisfying the matching condition 4), it is to judge whether there is a base rectangle on the base imaging plane satisfying the following condition: the base rectangle takes the feature point as one vertex; an extension line of a diagonal line of the base rectangle taking this feature point as one end point passes through the imaging plane at the diagonal position, and the length of the diagonal line is equal to a distance between two matching points of any two matching point groups corresponding to this feature point on the imaging plane at the diagonal position; the base rectangle is similar to the reference rectangle; and other vertices of the base rectangle are similar to the image features of the feature point, being matching points of this feature point on the base imaging plane;

if there is such a rectangle on the base imaging plane, it is to determine for any base rectangle whether there is a unique corresponding rectangle congruent to the base rectangle on the imaging plane at the diagonal position;

(In the examples of the present invention, the unique corresponding rectangle congruent to any base rectangle on the imaging plane at the diagonal position refers to a unique corresponding rectangle congruent to the base rectangle, wherein four vertices of the rectangle and four vertices at corresponding positions of the base rectangle mutually satisfy the matching conditions and have similar image features. Various existing matching operation methods or rules can be combined, to determine whether there is a unique corresponding rectangle corresponding to any base rectangle on the imaging plane at the diagonal position, while relevant matching operation methods or rules do not belong to the contents of invention of the present invention, therefore, detailed description will not be given herein, and a person ordinarily skilled in the art can consider combining a plurality of different manners to find out the unique corresponding rectangle.)

If yes, firstly a unique matching point corresponding to the feature point on the imaging plane at the diagonal position is determined, and then unique matching points of the feature point on the rest two imaging planes are determined according to the matching condition 1) and the matching condition 2), to exclude a matching point group having ambiguity, wherein a method of determining the unique matching point corresponding to the feature point on the imaging plane at the diagonal position is: if the feature point on the base imaging plane is one end point of one diagonal line of the base rectangle, the unique matching point on the imaging plane at the diagonal position is one of two end points on the diagonal line of the unique corresponding rectangle on the imaging plane at the diagonal position, wherein an extension line of the diagonal line passes through the feature point, if the feature point is at an upper end of the base rectangle, the unique corresponding matching point on the imaging plane at the diagonal position is a vertex at an upper end of the unique corresponding rectangle, otherwise it is a vertex at a lower end; for a non-unique matching point on the imaging plane at the diagonal position, it is able to be determined that the unique matching point of this point on the base imaging plane is another end point on the diagonal line where the feature point on the base imaging plane is located.

If no, two matching point groups corresponding to the feature point are corresponding to two different viewed points, and the two different viewed points are spatially located on an extension line of a pixel projection line of this feature point with respect to the base imaging plane;

if there is no such a rectangle on the base imaging plane, the plurality of matching point groups are corresponding to a plurality of different viewed points, and the plurality of viewed points are spatially located on an extension line of a pixel projection line of this feature point with respect to the base imaging plane.

Below detailed description is made with an example:

Referring to FIG. 12, simple description is as follows: assume that the imaging plane a is taken as a base imaging plane, for one feature point Pa on the imaging plane a, all of matching points matching this point on the imaging plane b, for example Pb and Pb1, are found out; next, for the feature point Pa, all of matching points matching this point on the imaging plane c, for example Pc and Pc2, are found out; further, Pb and Pb1, and Pc and Pc2 are re-matched, to determine sub-matching point groups (Pb, Pc) and (Pb1, Pc2); next, Pd corresponding to (Pb, Pc) and coordinates of Pd, and Pd3 corresponding to (Pb1, Pc2) and coordinates of Pd3 are determined respectively, if, upon judgment, image features of four imaging points among (Pa, Pb, Pc, Pd) are similar and image features of four imaging points among (Pa, Pb1, Pc2, Pd3) are also similar, the point Pa is corresponding to two matching point groups (Pa, Pb, Pc, Pd) and (Pa, NA, Pc2, Pd3); next it is determined that there is a base rectangle PaPa1Pa2Pa3 on the imaging plane a, the rectangle satisfying: taking Pa as one vertice, an extension line of the diagonal line PaPa3 passes through the imaging plane d and the length of PaPa3 is equal to the distance of PdPd3, similar to the reference rectangle, meanwhile image features of Pa, Pa1, Pa2 and Pa3 are similar, then it is further determined that there is a unique corresponding rectangle PdPd1Pd2Pd3 congruent to this rectangle on the imaging plane d, wherein Pa and Pd, Pa1 and Pd1, Pa2 and Pd2 and Pa3 and Pd3 are mutual corresponding matching points and have similar image features, then it can be determined that the unique matching point corresponding to Pa on the imaging plane d is Pd, and the non-unique matching point Pd3 on the imaging plane d is corresponding to the feature point Pa3 on the imaging plane a; whereby the matching point group (Pa, Pb1, Pc2, Pd3) is excluded, and it is determined that (Pa, Pb, Pc, Pd) is the unique matching point group corresponding to the same viewed point.

Figure 14:
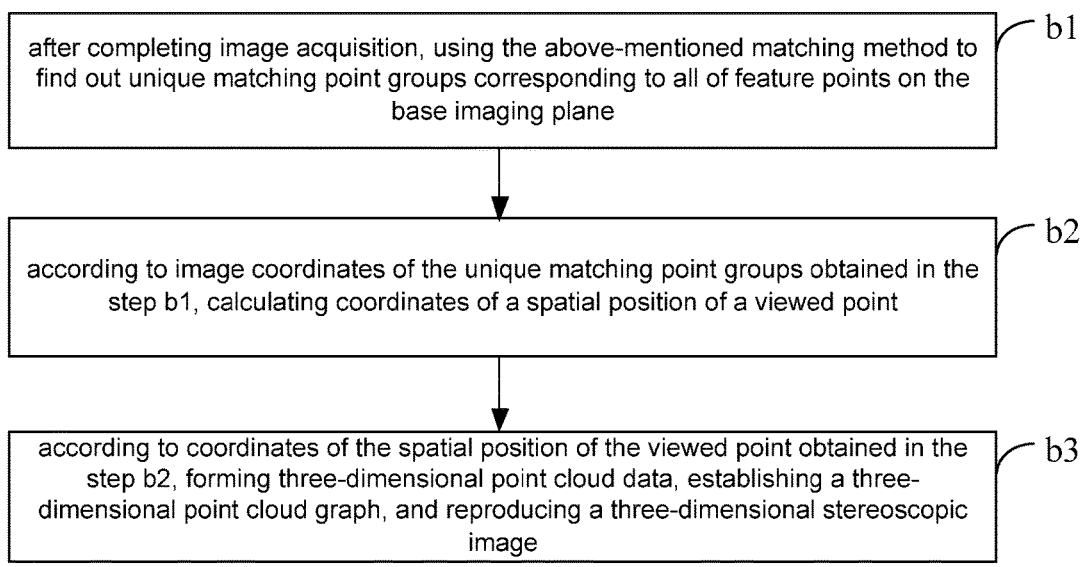
FIG. 14 is a flow chart of a measuring method based on the feature point matching method of a planar array of a four-camera group of an example of the present invention.

On the other hand, referring to FIG. 14, a measuring method based on the feature point matching method of the planar array of the four-camera group comprises the following steps:

b1. after completing image acquisition, using the above-mentioned matching method to find out unique matching point groups corresponding to all of feature points on the base imaging plane;

b2. according to image coordinates of the unique matching point groups obtained in the step b1, calculating coordinates of a spatial position of a viewed point, wherein in the step b2, if focal points of a camera a at an upper left position, a camera b at an upper right position, a camera c at a lower left position and a camera d at a lower right position of a four-camera group are Oa, Ob, Oc and Od respectively, and the four focal points are on a same plane and form one rectangle, the rectangle has a length OaOb of m, and a width OaOc of n, a central point of the rectangle is set to be O, and a three-dimensional rectangular coordinate system is set taking O as an origin, wherein an axis X is parallel to sides OaOb and OcOd of the rectangle, an axis Y is parallel to sides OaOc and ObOd of the rectangle, an axis Z is perpendicular to a plane where the focal points are located and is parallel to directions of optical axes of the four cameras, the four cameras have identical configuration, coordinates of a spatial position of one viewed point P of the viewed object are P(Px, Py, Pz), image coordinates of imaging points corresponding to the point P on the imaging planes of the four cameras, the camera a, the camera b, the camera c and the camera d, are Pa(Pax, Pay), Pb(Pbx, Pby), Pc(Pcx, Pcy), Pd(Pdx, Pdy) respectively, then expressions of coordinates of the spatial position of the point P are:

calculation formula for obtaining the coordinate Px in lateral matching of the imaging planes a and b $$P_x = \frac{m(P_{ax} + P_{bx} - u)}{2(P_{ax} - P_{bx})} = \frac{m(P_{ax} + P_{bx} - u)}{2\Delta x}$$

calculation formula for obtaining the coordinate Pz in the lateral matching of the imaging planes a and b $$P_z = \frac{mf}{P_{ax} - P_{bx}} = \frac{mf}{\Delta x}$$

calculation formula for obtaining the coordinate Px in lateral matching of the imaging planes c and d $$P_x = \frac{m(P_{cx} + P_{dx} - u)}{2(P_{cx} - P_{dx})} = \frac{m(P_{cx} + P_{dx} - u)}{2\Delta x}$$

calculation formula for obtaining the coordinate Pz in the lateral matching of the imaging planes c and d $$P_z = \frac{mf}{P_{cx} - P_{dx}} = \frac{mf}{\Delta x}$$

calculation formula for obtaining the coordinate Py in longitudinal matching of the imaging planes a and c $$P_y = \frac{n(P_{ay} + P_{cy} - v)}{2(P_{ay} - P_{cy})} = \frac{n(P_{ay} + P_{cy} - v)}{2\Delta y}$$

calculation formula for obtaining the coordinate Pz in the longitudinal matching of the imaging planes a and c $$P_z = \frac{nf}{P_{ay} - P_{cy}} = \frac{nf}{\Delta y}$$

calculation formula for obtaining the coordinate Py in longitudinal matching of the imaging planes b and d $$P_y = \frac{n(P_{by} + P_{dy} - v)}{2(P_{by} - P_{dy})} = \frac{n(P_{by} + P_{dy} - v)}{2\Delta y}$$

calculation formula for obtaining the coordinate Pz in the longitudinal matching of the imaging planes b and d $$P_z = \frac{nf}{P_{by} - P_{dy}} = \frac{nf}{\Delta y}$$

In the above, f indicates a focal length of the four cameras, u indicates a target surface length of the image sensor, and v indicates a target surface width of the image sensor, wherein $\Delta x$ is defined as a lateral offset value of an imaging point on the imaging plane b with respect to an imaging point on the imaging plane a and a lateral offset value of an imaging point on the imaging plane d with respect to an imaging point on the imaging plane c in the lateral matching, $\Delta y$ is defined as a longitudinal offset value of an imaging point on the imaging plane c with respect to an imaging point on the imaging plane a and a longitudinal offset value of an imaging point on the imaging plane d with respect to an imaging point on the imaging plane b in the longitudinal matching;

b3. according to coordinates of the spatial position of the viewed point obtained in the step b2, forming three-dimensional point cloud data, establishing a three-dimensional point cloud graph, and reproducing a three-dimensional stereoscopic image.

The matching method of the present invention and the three-dimensional measuring system thus constructed belong to autonomous matching method and measuring system, and the matching conditions and methods will not change with the external environment. Once parameters of the measuring system are determined, a view field measured by the system, measuring accuracy, spatial resolution, adaptability to environment and so on can be determined. For example, changing the focal length can measure a distant object, changing the cameras, for example, using an infrared camera can realize night measurement, and using a microscope lens can realize micro stereoscopic measurement and so on.

According to the above-mentioned methods and steps, calculation and measurement of a three-dimensional coordinate position of a feature point of a viewed object can be realized. However, since the imaging plane is affected by the view field, resolution, environment and illumination condition, parameters of the video camera itself such as aperture, shutter, shooting parameters such as exposure time and so on are adjusted, meanwhile the geometrical feature, edge feature, surface reflection and texture feature and so on of the viewed object will have effects on the matching of the imaging points, there must be the case where complete matching cannot be realized. Since the image feature also comprises other constraint conditions such as continuity, through the methods provided in the examples of the present invention, after the measurement of the image edge and other key points having prominent features are addressed, any known image processing methods and means can be used to perform image analysis and processing on other parts which cannot be completely matched, so that the problem of imaging of most three-dimensional objects can be solved, and on the basis of the existing image processing technologies, a basic matching method and measuring method are provided for the three-dimensional vision measuring technology.

In the several examples provided in the present invention, it should be understood that the provided methods can be implemented in other manners. It also should be noted that in some implementations as alternatives, the method steps or flows can take place in an order different from that indicated in the claims or the figures. For example, two consecutive steps or flows actually can be executed substantially in parallel, and they sometimes also can be executed in a reversed order, depending on specific conditions.

The methods or functions described in the present invention, if implemented in a form of software functional modules and marketed or used as independent products, can be stored in a computer readable storage medium. Based on such understanding, the technical solution of the present invention substantially or a part making contributing to the prior art or a part of the technical solution can be embodied in a form of a software product, this computer software product, stored in a storage medium, comprises several instructions configured to make one computer device (which can be a personal computer, a server or a network device and so on) execute all or part of the steps of the methods described in respective examples of the present invention. The preceding storage medium comprises various media which can store program codes, for example, USB flash disk, mobile hard disk, read-only memory, random access memory, diskette or compact disk and so on.

The above is merely for preferable examples of the present invention and not used to limit the present invention. For a person ordinarily skilled in the art, various modifications and changes may be made to the present invention. Any modifications, equivalent substitutions, improvements and so on made within the spirit and principle of the present invention should all fall within the scope of protection of the present invention.

The invention claimed is:

1. A feature point matching method of a planar array of a four-camera group, comprising steps as follows:
   a1. taking any imaging plane of four imaging planes corresponding to four cameras of a four-camera group as a base imaging plane, and determining, for one feature point on the base imaging plane, all matching points matching the feature point on an imaging plane adjacent to the base imaging plane in a lateral direction;
   a2. for the feature point on the base imaging plane in the step a1, finding out all matching points matching the feature point on an imaging plane adjacent to the base imaging plane in a longitudinal direction;
   a3. re-matching all of the matching points determined in the step a1 and all of the matching points found out in the step a2, to determine corresponding sub-matching point groups;
   a4. according to the feature point on the base imaging plane and all of the sub-matching point groups determined in the step a3, identifying matching points on an imaging plane at a diagonal position corresponding to the feature point on the base imaging plane and all of the sub-matching point groups determined in the step a3, wherein the imaging plane at the diagonal position is an imaging plane located at the diagonal position of the base imaging plane; and
   a5. according to the feature point on the base imaging plane, all of the sub-matching point groups determined in the step a3 and the matching points identified in the step a4, determining unique matching point groups on the four imaging planes corresponding to a same viewed point,
   wherein:
   in the step a1, for the feature point on the base imaging plane, all matching points matching the feature point on the imaging plane adjacent to the base imaging plane in the lateral direction are determined according to a matching condition (1), wherein the matching condition (1) is that, imaging points of one viewed point on two imaging planes adjacent in a lateral direction meet that:
      an imaging point of the viewed point on a left imaging plane and an imaging point of the viewed point on a corresponding right imaging plane are located on a same straight line parallel to a lateral coordinate axis, and a horizontal offset amount of the imaging point on the left imaging plane with respect to a coordinate origin of the left imaging plane is greater than a horizontal offset amount of the imaging point on the right imaging plane with respect to a coordinate origin of the right imaging plane;
   in the step a2, for the feature point on the base imaging plane in the step a1, all matching points matching the feature point on an imaging plane adjacent to the base imaging plane in a longitudinal direction are determined according to a matching condition (2), wherein the matching condition (2) is that, imaging points of one viewed point on two imaging planes adjacent in a longitudinal direction meet that:
      an imaging point of the viewed point on an upper imaging plane and an imaging point of the viewed point on a corresponding lower imaging plane are located on a same straight line parallel to a longitudinal coordinate axis, and a vertical offset amount of the imaging point on the upper imaging plane with respect to a coordinate origin of the upper imaging plane is greater than a vertical offset amount of the imaging point on the lower imaging plane with respect to a coordinate origin of the lower imaging plane; and
   in the step a3, all of the matching points determined in the step a1 and all of the matching points found out in the step a2 are re-matched according to a matching condition (3), to exclude matching points not satisfying the matching condition (3), and the matching points satisfying the matching condition (3) are paired according to magnitudes of lateral offset values or longitudinal offset values to form sub-matching point groups,
      wherein the matching condition (3) is that, a corresponding matching point group of one viewed point on four imaging planes of a four-camera group meets that:
         a ratio of a lateral offset value to a longitudinal offset value is equal to a ratio of a length to a width of a reference rectangle,
         wherein the lateral offset value is a difference between a horizontal offset amount of an imaging point of the viewed point on a left imaging plane with respect to a coordinate origin of the left imaging plane and a horizontal offset amount of an imaging point of the viewed point on a corresponding right imaging plane with respect to a coordinate origin of the right imaging plane, and the longitudinal offset value is a difference between a vertical offset amount of an imaging point of the viewed point on an upper imaging plane with respect to a coordinate origin of the upper imaging plane and a vertical offset amount of an imaging point of the viewed point on a corresponding lower imaging plane with respect to a coordinate origin of the lower imaging plane, wherein the reference rectangle is a rectangle formed by four focal points of a four-camera group.

2. The matching method according to claim 1, wherein:
in the step a4, according to the feature point on the base imaging plane and the sub-matching point groups determined in the step a3, a matching point on the imaging plane at the diagonal position for any sub-matching point group is determined according to the matching condition (1) and the matching condition (2), and coordinates of the matching point on the imaging plane at the diagonal position are obtained according to coordinates of all of the sub-matching point groups determined in the step a3, wherein the matching point has a lateral coordinate equal to a lateral coordinate of a matching point on an imaging plane longitudinally adjacent to the imaging plane at the diagonal position, and a longitudinal coordinate equal to a longitudinal coordinate of a matching point on an imaging plane laterally adjacent to the imaging plane at the diagonal position, wherein after the coordinates are determined, similarity matching of image features is performed to the matching point on the imaging plane at the diagonal position and the matching points on the other three imaging planes, wherein if the matching is successful, four imaging points on the four imaging planes form a matching point group; otherwise the matching point on the imaging plane at the diagonal position and the sub-matching point group determined in the step a3 corresponding to the matching point are excluded.

3. The matching method according to claim 2, wherein the feature point refers to an imaging point correspondingly having one or more matching points, and the imaging point has image features different from those of other imaging points.

4. The matching method according to claim 2, wherein:
in the step a5, unique matching point groups on the four imaging planes corresponding to a same viewed point satisfy a matching condition (4), wherein the matching condition (4) is that, imaging points of one viewed point on the four imaging planes corresponding to the four-camera group form one rectangle, a ratio of a lateral length to a longitudinal length of the rectangle is equal to a ratio of a length to a width of a reference rectangle, and imaging points on two pairs of two imaging planes located at diagonal positions are respectively located on two straight lines parallel to two diagonal lines of the reference rectangle.

5. The matching method according to claim 4, wherein:
in the step a5, if there is only one matching point group satisfying the matching condition (4), the matching result is unique.

6. The matching method according to claim 5, wherein the feature point refers to an imaging point correspondingly having one or more matching points, and the imaging point has image features different from those of other imaging points.

7. The matching method according to claim 4, wherein:
in the step a5, if there are a plurality of matching point groups satisfying the matching condition (4), it is to judge whether there is a base rectangle on the base imaging plane satisfying a condition as follows:
the feature point is used as one vertex of the base rectangle;
an extension line of a diagonal line of the base rectangle with the feature point as one vertex passes through the imaging plane at the diagonal position, and a length of the diagonal line is equal to a distance between two matching points of any two matching point groups corresponding to the feature point on the imaging plane at the diagonal position;
the base rectangle is similar to the reference rectangle; and
other vertices of the base rectangle are similar to the image features of the feature point, being matching points of the feature point on the base imaging plane;
if there is such a rectangle on the base imaging plane, it is to determine for any base rectangle whether there is a unique corresponding rectangle congruent to the base rectangle on the imaging plane at the diagonal position;
if there is a unique corresponding rectangle congruent to the base rectangle on the imaging plane at the diagonal position, firstly a unique matching point corresponding to the feature point on the imaging plane at the diagonal position is determined, and then unique matching points of the feature point on the rest two imaging planes are determined according to the matching condition (1) and the matching condition (2), to exclude a matching point group having ambiguity, wherein a method of determining the unique matching point corresponding to the feature point on the imaging plane at the diagonal position is:
if the feature point on the base imaging plane is one end point of one diagonal line of the base rectangle, the unique matching point on the imaging plane at the diagonal position is one of two vertices on the diagonal line of the unique corresponding rectangle on the imaging plane at the diagonal position, wherein an extension line of the diagonal line passes through the feature point,
if the feature point is at an upper end of the base rectangle, the unique corresponding matching point on the imaging plane at the diagonal position is a vertex at an upper end of the unique corresponding rectangle, otherwise it is a vertex at a lower end;
for a non-unique matching point on the imaging plane at the diagonal position, it is able to be determined that the unique matching point of the point on the base imaging plane is another end point on the diagonal line where the feature point on the base imaging plane is located;
if there is not a unique corresponding rectangle congruent to the base rectangle on the imaging plane at the diagonal position, two matching point groups corresponding to the feature point are corresponding to two different viewed points, and the two different viewed points are spatially located on an extension line of a pixel projection line of the feature point with respect to the base imaging plane; and
if there is no such a rectangle on the base imaging plane, the plurality of matching point groups are corresponding to a plurality of different viewed points, and the plurality of different viewed points are spatially located on an extension line of a pixel projection line of the feature point with respect to the base imaging plane.

8. The matching method according to claim 7, wherein the feature point refers to an imaging point correspondingly having one or more matching points, and the imaging point has image features different from those of other imaging points.

9. The matching method according to claim 4, wherein the feature point refers to an imaging point correspondingly having one or more matching points, and the imaging point has image features different from those of other imaging points.

10. The matching method according to claim 1, wherein the feature point refers to an imaging point correspondingly having one or more matching points, and the imaging point has image features different from those of other imaging points.

11. A measuring method based on a feature point matching method of a planar array of a four-camera group, comprising steps as follows:
  b1. acquiring an image, and after completing image acquisition, using a feature point matching method of a planar array of a four-camera group to determine unique matching point groups corresponding to all of feature points on a base imaging plane, wherein the feature point matching method of a planar array of a four-camera group comprises steps as follows:
    a1. taking any imaging plane of four imaging planes corresponding to four cameras of a four-camera group as a base imaging plane, and determining, for one feature point on the base imaging plane, all matching points matching the feature point on an imaging plane adjacent to the base imaging plane in a lateral direction,
    a2. for the feature point on the base imaging plane in the step a1, finding out all matching points matching the feature point on an imaging plane adjacent to the base imaging plane in a longitudinal direction,
    a3. re-matching all of the matching points determined in the step a1 and all of the matching points found out in the step a2, to determine corresponding sub-matching point groups,
    a4. according to the feature point on the base imaging plane and all of the sub-matching point groups determined in the step a3, identifying matching points on an imaging plane at a diagonal position corresponding to the feature point on the base imaging plane and all of the sub-matching point groups determined in the step a3, wherein the imaging plane at the diagonal position is an imaging plane located at the diagonal position of the base imaging plane, and
    a5. according to the feature point on the base imaging plane, all of the sub-matching point groups determined in the step a3 and the matching points identified in the step a4, determining unique matching point groups on the four imaging planes corresponding to a same viewed point;
  b2. according to image coordinates of the unique matching point groups obtained in the step b1, calculating coordinates of a spatial position of a viewed point; and
  b3. according to coordinates of the spatial position of the viewed point obtained in the step b2, forming three-dimensional point cloud data, establishing a three-dimensional point cloud graph, and reproducing a three-dimensional stereoscopic image, wherein in the step b2, if focal points of a camera a at an upper left position, a camera b at an upper right position, a camera c at a lower left position and a camera d at a lower right position of a four-camera group are Oa, Ob, Oc and Od respectively, and the four focal points are on a same plane and form one rectangle, the rectangle has a length OaOb of m, and a width OaOc of n, a central point of the rectangle is set to be 0, and a three-dimensional rectangular coordinate system is set taking 0 as an origin, wherein
  an axis X is parallel to sides OaOb and OcOd of the rectangle,
  an axis Y is parallel to sides OaOc and ObOd of the rectangle,
  an axis Z is perpendicular to a plane where the focal points are located and is parallel to directions of optical axes of the four cameras,
the four cameras have identical configurations,
coordinates of a spatial position of one viewed point P of a viewed object are $P(P_x, P_y, P_z)$,
image coordinates of imaging points corresponding to the point P on the imaging planes of the four cameras, the camera a, the camera b, the camera c and the camera d, are Pa(Pax, Pay), Pb(Pbx, Pby), Pc(Pcx, Pcy), Pd(Pdx, Pdy) respectively,
then expressions of coordinates of the spatial position of the point P are:
calculation formula for obtaining the coordinate Px in lateral matching of the imaging planes of camera a and of camera b
calculation formula for obtaining the coordinate $P_z$ in the lateral matching of the imaging planes of camera a and of camera b
calculation formula for obtaining the coordinate Px in lateral matching of the imaging planes of camera c and of camera d
calculation formula for obtaining the coordinate Pz in the lateral matching of the imaging planes of camera c and of camera d
calculation formula for obtaining the coordinate Py in longitudinal matching of the imaging planes of camera a and of camera c
calculation formula for obtaining the coordinate Pz in the longitudinal matching of the imaging planes of camera a and of camera c
calculation formula for obtaining the coordinate Py in longitudinal matching of the imaging planes of camera b and of camera d
calculation formula for obtaining the coordinate Pz in the longitudinal matching of the imaging planes of camera b and of camera d
wherein:
  f indicates a focal length of the four cameras,
  u indicates a target surface length of the image sensor, and
  v indicates a target surface width of the image sensor,
wherein
  $\Delta x$ is defined as a lateral offset value of an imaging point on the imaging plane b with respect to an imaging point on the imaging plane a and a lateral offset value of an imaging point on the imaging plane d with respect to an imaging point on the imaging plane c in the lateral matching, and
  $\Delta y$ is defined as a longitudinal offset value of an imaging point on the imaging plane c with respect to an imaging point on the imaging plane a and a longitudinal offset value of an imaging point on the imaging plane d with respect to an imaging point on the imaging plane b in the longitudinal matching.

* * * * *